United States Patent
Naskar

(10) Patent No.: US 9,096,959 B2
(45) Date of Patent: Aug. 4, 2015

(54) METHOD FOR PRODUCTION OF CARBON NANOFIBER MAT OR CARBON PAPER

(75) Inventor: Amit K. Naskar, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 670 days.

(21) Appl. No.: 13/402,139

(22) Filed: Feb. 22, 2012

(65) Prior Publication Data

US 2013/0214442 A1 Aug. 22, 2013

(51) Int. Cl.

| | | |
|---|---|---|
| *C01B 31/02* | (2006.01) |
| *D04H 1/4242* | (2012.01) |
| *D06M 11/56* | (2006.01) |
| *D04H 3/10* | (2012.01) |
| *D06M 13/256* | (2006.01) |
| *D04H 3/007* | (2012.01) |
| *C08F 8/36* | (2006.01) |
| *D06M 11/54* | (2006.01) |
| *D01F 1/10* | (2006.01) |
| *D01F 9/21* | (2006.01) |
| *D21H 13/50* | (2006.01) |
| *D21H 13/40* | (2006.01) |

(52) U.S. Cl.
CPC ............... *D04H 1/4242* (2013.01); *C08F 8/36* (2013.01); *D01F 1/10* (2013.01); *D01F 9/21* (2013.01); *D04H 3/007* (2013.01); *D04H 3/10* (2013.01); *D06M 11/54* (2013.01); *D06M 11/56* (2013.01); *D06M 13/256* (2013.01); *D21H 13/40* (2013.01); *D21H 13/50* (2013.01)

(58) Field of Classification Search
CPC ............. C01B 31/02; C08F 8/36; D01F 9/21; D04H 1/4291; D04H 1/44; D04H 1/544; D04H 3/007; D04H 3/10; D06M 11/54; D06M 11/55; D06M 13/256
USPC .................... 264/29.2, 83, 103, 210.2, 210.3, 264/211.12, 211.14, 211.16, 211.17, 264/211.19, 211.2, 555; 423/447.1, 447.2
See application file for complete search history.

(56) References Cited

U.S. PATENT DOCUMENTS

| | | |
|---|---|---|
| 2,796,331 A | 6/1957 | Kauffman et al. |
| 2,822,321 A | 2/1958 | Pickard |
| 2,913,802 A | 11/1959 | Barnett |
| 2,957,756 A | 10/1960 | Bacon |

(Continued)

FOREIGN PATENT DOCUMENTS

| | | |
|---|---|---|
| DE | 1 923 622 | 2/1970 |
| GB | 1 251 822 | 11/1971 |
| JP | 2001011761 A | * 1/2001 |

OTHER PUBLICATIONS

Pyromex® Continuous Filament Tow, *Toho Tenax America, Inc.*, (May 1, 2009).

(Continued)

*Primary Examiner* — Leo B Tentoni
(74) *Attorney, Agent, or Firm* — Scully, Scott, Murphy & Presser, P.C.

(57) ABSTRACT

Method for the preparation of a non-woven mat or paper made of carbon fibers, the method comprising carbonizing a non-woven mat or paper preform (precursor) comprised of a plurality of bonded sulfonated polyolefin fibers to produce said non-woven mat or paper made of carbon fibers. The preforms and resulting non-woven mat or paper made of carbon fiber, as well as articles and devices containing them, and methods for their use, are also described.

38 Claims, 9 Drawing Sheets

(56) References Cited

U.S. PATENT DOCUMENTS

| | | |
|---|---|---|
| 3,011,981 A | 12/1961 | Soltes |
| 3,027,222 A | 3/1962 | Wilkinson |
| 3,053,775 A | 9/1962 | Abbott |
| 3,107,152 A | 10/1963 | Ford et al. |
| 3,107,180 A | 10/1963 | Diefendorf |
| 3,230,029 A * | 1/1966 | Maltese et al. .................... 8/539 |
| 3,367,851 A | 2/1968 | Filreis et al. |
| 3,402,221 A * | 9/1968 | Caldwell ....................... 525/167 |
| 3,887,747 A * | 6/1975 | Tamura et al. ........... 264/29.2 X |
| 4,070,446 A * | 1/1978 | Horikiri et al. ............ 423/447.2 |
| 4,217,386 A | 8/1980 | Arons et al. |
| 4,497,789 A | 2/1985 | Sawran et al. |
| 4,501,641 A | 2/1985 | Hirakawa et al. |
| 4,804,577 A | 2/1989 | Hazelton et al. |
| 4,810,576 A | 3/1989 | Gaa et al. |
| 5,360,669 A | 11/1994 | Noland et al. |
| 5,380,580 A | 1/1995 | Rogers et al. |
| 5,942,288 A | 8/1999 | Kajander |
| 6,551,353 B1 | 4/2003 | Baker et al. |
| 6,759,352 B2 | 7/2004 | Delanoy et al. |
| 7,041,192 B2 | 5/2006 | Delanoy et al. |
| 7,338,684 B1 | 3/2008 | Curliss et al. |
| 7,534,854 B1 | 5/2009 | Paulauskas et al. |
| 7,649,078 B1 | 1/2010 | Paulauskas et al. |
| 7,786,253 B2 | 8/2010 | Paulauskas et al. |
| 7,927,701 B2 | 4/2011 | Curliss et al. |
| 2004/0081829 A1 * | 4/2004 | Klier et al. .................... 428/394 |
| 2006/0013863 A1 * | 1/2006 | Shalaby et al. ............... 424/443 |
| 2008/0311815 A1 | 12/2008 | Gupta et al. |

OTHER PUBLICATIONS

Shannon M.A. et al., "Science and Technology for Water Purification in the Coming Decades", *Nature*, 452:301-310 (Mar. 20, 2008).

Janney M. et al., "Fabrication of Chopped Fiber Preforms by the 3-DEP Process", *Composites & Polycon*, pp. 1-8 (Oct. 17-19, 2007).

Pyromex® Oxidized PAN Fiber, *Toho Tenax Co., Ltd.*, received Mar. 13, 2006 (precise date of publication not available).

Walker R.A. et al., "Carbon Mats from Melt Spun Polyacrylonitrile Based Precursors for Automotive Composites", *Plastics, Rubber and Composites*, 35(6/7):242-246 (2006).

Du C. et al., "High Power Density Supercapacitor Electrodes of Carbon Nanotube Films by Electrophoretic Deposition", *Nanotechnology*, 17:5314-5318 (2006).

Daley M.A. et al., "Elucidating the Porous Structure of Activated Carbon Fibers Using Direct and Indirect Methods", *Carbon*, 34(10):1191-1200 (1996).

Peebles L.H., "Carbon Fibers Formation, Structure, and Properties", *CRC Press*, pp. 9-19, 24-27 (1995).

Thwaites M.W. et al., "Synthesis and Characterization of Activated Pitch-Based Carbon Fibers", *ACS Spring* (San Francisco), *Symposium on Novel Approaches in Coal Liquefaction*, 37(2):497-504 (1992).

Boyer D.C. et al., "Nonwoven Carbon Fiber Composites", *Tappi Journal*, pp. 97-99 (May 1990).

Postema A.R. et al., "Amorphous Carbon Fibres from Linear Low Density Polyethylene", *Journal of Materials Science*, 25:4216-4222 (1990).

\* cited by examiner (2A)

(2B)

METHOD FOR PRODUCTION OF CARBON NANOFIBER MAT OR CARBON PAPER

This invention was made with government support under Prime Contract No. DE-AC05-00OR22725 awarded by the U.S. Department of Energy. The government has certain rights in the invention.

FIELD OF THE INVENTION

The present invention relates, generally, to methods for producing mats or paper made of carbon fiber, and more particularly, wherein such methods include carbonization of a polyolefin fiber precursor.

BACKGROUND OF THE INVENTION

Carbon fiber mat and carbon film or paper are used in several specialized applications, such as in high-strength or abrasion-resistant structural composites, electromagnetic shielding, filtration materials, and electrodes. Because of the desirable physical properties of carbon fiber, there is a growing desire to expand the applications of carbon fiber mat and carbon paper beyond these specialized applications.

However, carbon fiber mat and carbon paper are currently cost-prohibitive when considered for high-volume mainstream applications. The reason for the high cost is primarily due to the cost of precursor, as well as the laborious and complex methods used for producing carbon fiber mat and carbon films or paper.

Mats made of carbon fiber (e.g., carbon nanotubes) are typically produced by, for example, vapor phase methods, or by extrusion or spinning (e.g., melt or electrospinning) of a carbon fiber precursor (e.g., polyacrylonitrile, i.e., PAN, or pitch) followed by carbonization. These methods are generally time and energy intensive, and thus, generally unsuited for large-scale production. Moreover, although thermally bonded non-woven mats made from PAN type precursors are known in the literature (e.g., Walker R. A., et al., "Carbon mats from melt-spun polyacrylonitrile-based precursors for automotive composites" *Plastic Rubbers and Composites*, 35(6/7), 242-246 (2006)), such processing generally entails diffusion-controlled oxidative stabilization of the precursors mats. However, oxidative stabilization of PAN fibers is a demanding and complex process, and thus, difficult to integrate into a large-scale industrial process, specifically for thick bundles of filaments in felt or bonded mat form that is neither woven nor knitted.

SUMMARY OF THE INVENTION

The invention is particularly directed to a simplified and economical process for the production of a non-woven mat or paper made of carbon fibers in which continuous or discontinuous (i.e., chopped) sulfonated polyolefin fibers are bonded as a mat or paper preform, and the preform carbonized to form the carbon fiber mat or paper. Alternatively, unsulfonated polyolefin fiber is bonded to form a mat or paper preform, and the preform sulfonated and then carbonized to form the carbon fiber mat or paper.

Besides being simpler and more economical than processes taught in the art, the process described herein is highly amenable to scaled up production. Moreover, the method described herein advantageously does not require an oxidative stabilization step, as often used in processing of PAN fibers, since the non-woven mats or paper described herein are produced from polyolefin fiber. Instead, the instant invention employs a sulfonation step (if the polyolefin fiber is not already sulfonated). An additional advantage of the instant invention is that polyolefin fiber is generally less expensive than PAN fiber, and moreover, much polyolefin fiber can be reclaimed from discarded materials.

It has herein been unexpectedly found that sulfonated polyolefin fibers form strong interfilament bonds, presumably by hydrogen bonding, when contacted with water, moisture, or other polar solvents or their vapors. The bonding can also be due to ionic interaction of the salts of the sulfonic acid groups present in sulfonated filaments. This characteristic has been exploited in the instant process for self-assembling a mat or paper preform containing strongly bonded sulfonated polyolefin fibers. Thus, in a particularly simplified embodiment of the method, an aqueous slurry of sulfonated polyolefin fibers is formed and then separated from the aqueous media (e.g., by filtration) to form a bonded network of sulfonated polyolefin fibers, and the bonded network carbonized to form the carbon fiber mat or paper.

The invention is also directed to any of the mat or paper preforms (i.e., precursors) described above, as well as the resulting non-woven mat or paper made of carbon fibers. The invention is furthermore directed to articles and devices in which the preform or non-woven mat or paper made of carbon fibers can be incorporated. The invention is still further directed to methods for using any of the preforms and resulting non-woven mat or paper made of carbon fibers in any suitable application, e.g., in a water filtration or purification process, gas adsorption process, gas separation process, water desalination process, charge storage process, electrochemical reaction process, smoke reduction or removal process, or catalytic process (e.g., as catalyst support material).

DETAILED DESCRIPTION OF THE INVENTION

Figure 1:
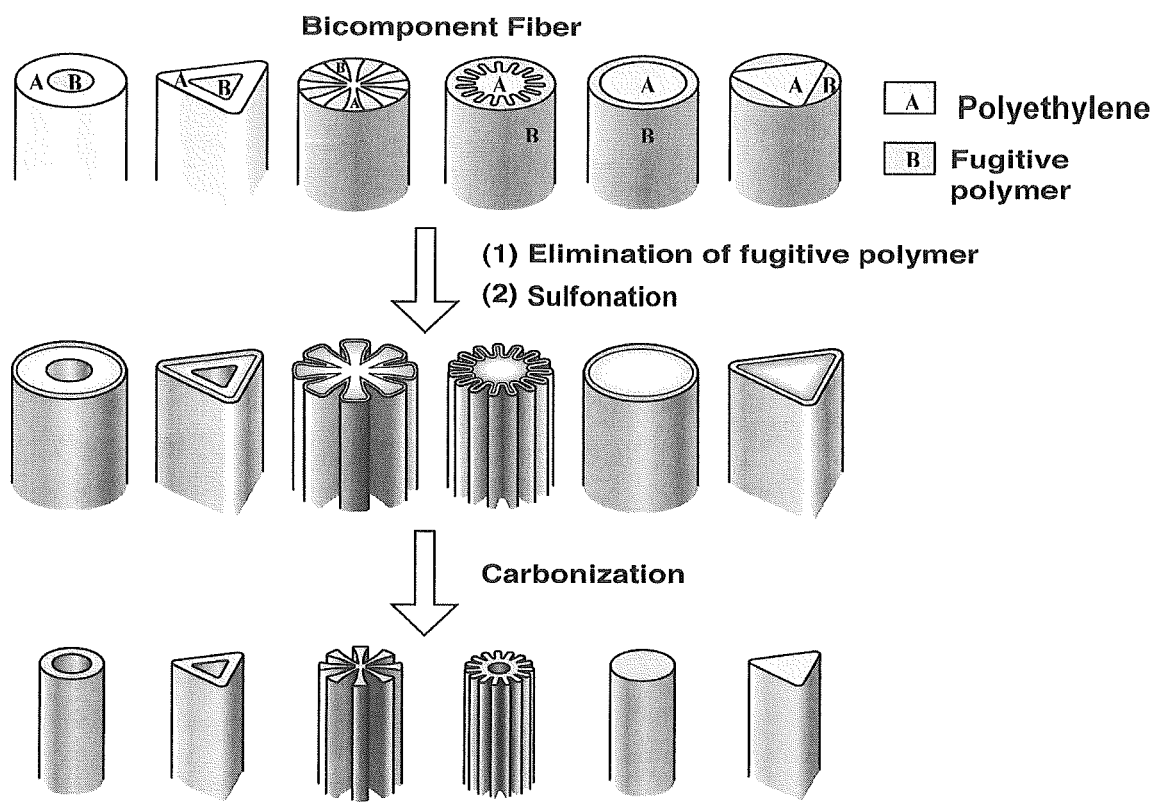
FIG. 1. Schematic illustration showing an exemplary process for producing carbon fibers having a variety of shapes on the outer surface. The method employs a bi-component fiber having an outer soluble fugitive polymer and a polyolefin component (such as a polyolefin core component) having a specified shape. After elimination of the fugitive layer, the polyolefin core component is sulfonated and carbonized to form a carbon fiber having a specified outer shape. A hollow core may also be included by surface layer sulfonation of the polyolefin core component followed by carbonization. Based on the component ratio, very small diameter polyolefin core filaments that can be subsequently carbonized are produced.

As used herein, the term "about" generally indicates within ±0.5, 1, 2, 5, or 10% of the indicated value. For example, in its broadest sense, the phrase "about 20 μm" can mean 20 μm±10%, which indicates 20±2 μm or 18-22 μm.

The invention is foremost directed to methods for the preparation of a non-woven mat, paper, or film made of carbon fibers. The carbon fibers in the non-woven mat or paper are interconnectedly bonded together (i.e., fused) to form a single cohesive unit in which the fibers will generally not unravel or separate from each other under most conditions. Generally, the non-woven mat or paper is porous, but the non-woven mat or paper may be less porous or completely or substantially non-porous if the fibers are appropriately tightly spaced. As generally understood in the art, if the interconnected randomly oriented (or preferentially oriented) filaments are held together loosely (i.e., with loops or gaps in a non-flattened form) the bonded filaments are generally referred to as a non-woven mat. However, if the bonded filaments are closely packed and substantially flattened as a sheet, the bonded filaments are generally referred to as a paper or film. The terminology used here is similar to that used for non-woven mat made from cellulosic filaments, such as cotton or rayon, whereas the pressed thin films of bonded cellulosic fibrils of very small diameters are referred to as paper.

In the method, a non-woven mat or paper preform (i.e., precursor) containing a plurality of bonded sulfonated polyolefin fibers is first provided. The preform may have been produced, in whole or in part, at a separate time (i.e., is in storage) and/or in a facility separate from where carbonization of the preform is performed. Alternatively, the preform (and optionally, the precursor sulfonated or unsulfonated fiber) may be manufactured, in whole or in part, just before carbonization and/or in the facility where carbonization is performed, i.e., as an integrated or continuous operation. As used herein, the term "sulfonated" is meant to be inclusive of sulfonation and any other type of sulfuration that may occur on the surface of polyolefin fibers during a sulfonation process. Some other types of sulfuration that may occur on the surface of the polyolefin fibers during a sulfonation process may be, for example, sulfation, chloro-sulfonation, sulfoxidation, as well as the production of sulfonic acid groups and esters thereof. In some embodiments, any one or more of the foregoing exemplary sulfur-containing groups may be absent, or in a predominant or minor amount relative to other sulfur-containing groups.

By one embodiment, the preform is manufactured by bonding polyolefin fibers that have been sulfonated. Any suitable methodology for bonding the sulfonated polyolefin fibers is applicable herein. The bonding can be, for example, a chemically- or physically-induced bonding process. A chemically-induced bonding process relies on one or more chemicals that cause or encourage the sulfonated fibers to bond, and the one or more chemicals or a degradation product thereof may or may not remain in the final carbon mat or paper. A physically-induced bonding process relies on one or more physical processes, such as, for example, pressure, heat, or a radiative source (e.g., electromagnetic or particle bombardment) to induce bonding.

In a preferred embodiment, the sulfonated polyolefin fibers are bonded by contacting the sulfonated polyolefin fibers with water. Without being bound by any theory, the strong interfilament bonding is believed to be mediated by the presence of sulfur-containing and possibly other oxidized groups on the surface of the sulfonated polyolefin fibers that likely form extensive hydrogen bonding interactions with each other particularly when they interact with water molecules.

As used herein, the term "water" can be relatively or substantially pure water, or alternatively, an aqueous solution. Relatively or substantially pure water is generally composed completely of water, except for trace elements that may normally be found in water of relative or substantial purity. In some embodiments, the water may be ultrapure (i.e., up to 14, 16, or 18 MOhm). An aqueous solution, if used, may include one or more additional solvents or a solute, as long as the additional components in the water do not substantially hinder or adversely affect the ability of the sulfonated polyolefin fibers to bond. The additional solvent or solute may function, for example, as wetting agents, surfactants, agglomerating agents, or bonding agents. The solvent is necessarily a polar protic or aprotic solvent miscible in water, such as an alcohol (e.g., methanol, ethanol, or isopropanol), dimethylformamide, dimethylacetamide, dimethylsulfoxide, acetone, glycerol, or ethylene glycol. The solute can be, for example, an inorganic compound or salt (e.g., lithium, sodium, and potassium salts of a halide, hydroxide, nitrate, or mineral acid), an inorganic polymeric material (e.g., a polysiloxane or sol-gel), an organic polymeric material (e.g., a polyacrylate or polyacrylamide), or an organic compound (e.g., a fluorinated surfactant, wetting agent, polyol, or polyalkylene glycol). In some embodiments, any one or all of the additional solvents or solutes described above (or any additional solvent or solute altogether) are excluded. In other embodiments, any one or a combination of the above-listed solvents may be used instead of water to make contact with the sulfonated filaments in order to effect a strong interfilament bonding.

In some embodiments, the sulfonated fibers are soaked in aqueous mineral acids such as hydrochloric acid, sulfuric acid, nitric acid, chlorosulfonic acid, or aqueous alkaline solutions of metal hydroxides or nonmetallic hydroxide (e.g., ammonium hydroxide) in order to effect hydrogen or ionic bonding in dried filament bundles of preferred orientation or random orientation. In some embodiments, the filaments are in continuous or chopped forms of finite lengths.

In some embodiments, the sulfonated polyolefin fibers are contacted with water by immersing the sulfonated polyolefin fibers in water or an aqueous solution. The sulfonated polyolefin fibers can be immersed in water or aqueous solution by, for example, submerging the fibers into water or an aqueous solution, passing water or an aqueous solution over the fibers, or spraying the fibers with water or an aqueous solution. Generally, excess water (i.e., water or aqueous solution beyond that which coats the fibers) is removed either by filtration, draining, or drying, or a combination of these. The resulting fibers after excess water removal become strongly bonded to form a mat or paper preform. In other embodiments, the sulfonated polyolefin fibers, during or after contact with water are passed through a slit die in order to orient the fibers in a special arrangement to make a mat or paper preform. When being passed through a slit die, the fibers are generally in the form of a viscous suspension and then placed under pressure in a hot chamber where solvents volatilize. Generally, after excess water is removed, the sulfonated polyolefin fibers are dried or annealed either under ambient conditions (e.g., 20-35° C.) or at an elevated temperature, such as a temperature of precisely, about, at least, up to, or less than 40, 50, 60, 70, 80, 90, 100, 120, 150, 175, 200, 250, or 300° C., or a temperature within a range bounded by any two of the foregoing values.

In other embodiments, the sulfonated polyolefin fibers are contacted with water by contacting the sulfonated polyolefin fibers with water vapor. Any gaseous atmosphere containing water vapor is applicable herein. Typically, the humidity level of the water-containing atmosphere is precisely, about, or at least, for example, 5%, 10%, 20%, 30%, 40%, 50%, 60%, 70%, 80%, 90%, 95%, or 100%. The water-containing atmosphere generally includes, besides water vapor, those gases normally found in air, or an inert atmosphere, such as nitrogen, argon, or carbon dioxide. The water-containing atmosphere may or may not also include one or more reactive gases that function, for example, to further encourage interfilament bonding or alter the surface chemistry of the fibers.

The sulfonated polyolefin fibers and/or the water contacting the sulfonated polyolefin fibers may be held at any suitable temperature during contact of the fibers with water or an aqueous solution. In some embodiments, the fibers and/or water are at room temperature, such as precisely or about 20, 25, 30, or 35° C. In other embodiments, the fibers and/or water are at an elevated temperature, such as precisely or about 40, 50, 60, 70, 80, 90, or 100° C. In other embodiments, the fibers and/or water are at a depressed temperature, such as precisely or about 0, 10, or 15° C. In some embodiments, the temperature of the fibers and/or water is within a range bounded by any two of the exemplary temperatures provided above.

One or more additional steps or conditions can be employed, besides contact with water, to promote interfilament bonding in the sulfonated polyolefin fibers. The one or more additional steps or conditions can be, for example, any of the chemical or physical bonding techniques generally discussed above and as known in the art. In a particular embodiment, a hot stamping process or mechanical pinning, as well known in the art, is applied to the sulfonated polyolefin fibers. The sulfonated polyolefin fibers may also be coated with a plasticizer, which can be any suitable plasticizing compound or material, such as a polyol (e.g., ethylene glycol, diethyleneglycol, or glycerol) or organic solvent. In some embodiments, the sulfonated polyolefin fibers are subjected to a hot stamping process, mechanical pinning, or plasticization without first exposing (or ever exposing) the fibers to water.

To produce the mat or paper preform, partially or completely sulfonated polyolefin fibers may be arranged in a non-woven mat or paper form, and then bonded, as described above, to form the preform. In other embodiments, unsulfonated polyolefin fibers are arranged in a non-woven mat or paper form, and then bonded, by any of the chemical or physical techniques described above (e.g., hot stamping, partial melting, or plasticization) to form a preform that is then subjected to sulfonation conditions to partially or completely sulfonate the preform. In yet other embodiments, a non-woven mat or paper preform composed of partially sulfonated polyolefin fibers is subsequently further sulfonated. In particular embodiments, unsulfonated polyolefin fibers are arranged in a non-woven mat or paper form, and then bonded by any of the processing techniques known in the art for producing a spun-bonded or melt-blown mat, before being sulfonated.

The method described herein may furthermore include a process for producing the sulfonated polyolefin fibers. Sulfonated polyolefin fibers can be produced by any of the methods and conditions known in the art for sulfonating polyolefin fibers. The sulfonation methods and conditions considered herein can be any of the processes known in the art in which a polymer fiber is exposed to a source of $SO_x$ species (typically, $SO_2$, preferably in an oxidizing environment, such as $O_3$, and/or $SO_3$ in an inert environment) for the purpose of sulfonating the polymer fiber. The sulfonation methods and conditions considered herein can be, for example, any of the processes known in the art in which a polymer fiber is submerged in a sulfonation bath of, for example, sulfuric acid, fuming sulfuric acid, or chlorosulfonic acid, or their mixtures, in order to sulfonate the polymer fiber. As further discussed below, the conditions of the sulfonation step can be selected to either completely sulfonate or partially sulfonate the polyolefin fiber. For example, adjustments in residence time, processing temperature, and reactivity or concentration of the sulfonating species will also adjust the degree of sulfonation. Therefore, one or more of these variables can be suitably modified to achieve a complete, partial, or specific degree of sulfonation.

As used herein, the terms "partially sulfonated," "partial sulfonation," "incompletely sulfonated," or "incomplete sulfonation" all have equivalent meanings and are defined as an amount of sulfonation below a saturated (or "complete") level of saturation. The degree of sulfonation can be determined by, for example, measuring the thermal characteristics (e.g., softening or charring point, or decomposition temperature associated with pyrolysis of incompletely sulfonated polyolefin) or physical characteristics (e.g., density, rigidity, or weight fraction of decomposable unsulfonated-polymer segment) of the partially sulfonated fiber. Since rigidity, as well as the softening and charring point (and thermal infusibility, in general) all increase with an increase in sulfonation, monitoring of any one or combination of these characteristics can be correlated with a level of sulfonation relative to a saturated level of sulfonation. In particular, a fiber can be considered to possess a saturated level of sulfonation by exhibiting a constant thermal or physical characteristic with increasing sulfonation treatment time. In contrast, a fiber that has not reached a saturated level of sulfonation will exhibit a change in a thermal or physical characteristic with increasing sulfonation treatment time. Moreover, if the fiber with a saturated degree of sulfonation is taken as 100% sulfonated, fibers with a lesser degree of sulfonation can be ascribed a numerical level of sulfonation below 100%, which is commensurate or proportionate with the difference in thermal or physical characteristic between the partially sulfonated fiber and completely sulfonated fiber. In different embodiments, the fiber precursor is sulfonated up to or less than a sulfonation degree of 95%, 90%, 85%, 80%, 75%, 70%, 65%, 60%, 55%, 50%, 45%, 40%, 35%, 30%, 25%, 20%, 15%, 10%, or 5% relative to a saturated level of sulfonation taken as 100%. The level of sulfonation can be further verified or made more accurate by an elemental analysis.

In one embodiment, to sulfonate the polyolefin fiber or a mat or paper preform thereof, the polyolefin fiber is submerged into or passed through a liquid containing sulfur trioxide ($SO_3$), a sulfur trioxide precursor (e.g., chlorosulfonic acid, $HSO_3Cl$), sulfur dioxide ($SO_2$), or a mixture thereof. In some embodiments, the polyolefin fiber is passed through the liquid by pulling the fiber into the liquid from a creel of fiber spool either unconstrained or held at a specified tension. Typically, the liquid containing sulfur trioxide is fuming sulfuric acid (i.e., oleum, which typically contains 5-30% (or more particularly, 15-30%) free $SO_3$) or chlorosulfonic acid, or a liquid solution thereof.

In other embodiments, to sulfonate the polyolefin fiber or a mat or paper preform thereof, the polyolefin fiber is contacted with a sulfonating gas in a gaseous atmosphere (i.e., not in a liquid). For example, the polyolefin fiber can be introduced into a chamber containing $SO_2$ or $SO_3$ gas, or a mixture thereof, or a gaseous reactive precursor thereof, or mixture of the $SO_2$ and/or $SO_3$ gas with another gas, such as oxygen, ozone, or an inert gas, such as nitrogen or a noble gas (e.g., helium or argon).

The sulfonating liquid or gas may also include (i.e., be admixed with) one or more additional oxidants that may favorably adjust the density or type of oxidized groups formed on the polyolefin fiber surface. Some examples of additional oxidants include ozone, air, oxygen, an inorganic or organic peroxide (e.g., hydrogen peroxide, cumene peroxide, or benzoyl peroxide), a peroxy acid (e.g., a peroxysulfuric or peroxycarboxylic acid), a chromate or dichromate (e.g., $K_2Cr_2O_7$), permanganate (e.g., $KMnO_4$), hypochlorite (e.g., HOCl or NaOCl), chlorite, perchlorate (e.g., $NaClO_4$), or nitrate (e.g., $HNO_3$ or $KNO_3$).

In other embodiments, to sulfonate the polyolefin fiber, a polyolefin precursor resin is melt-mixed with a sulfonation additive (i.e., sulfonated solid-state material that evolves a $SO_x$ gas at elevated temperatures), and the resulting melt-mixed composite spun to produce a melt-mixed composite fiber. Thus, the melt-mixed composite fiber contains polyolefin precursor resin as an unsulfonated matrix material within which the sulfonation additive is incorporated. The resulting melt-mixed composite fiber (i.e., "melt-spun fiber") is then heated to a desulfonation temperature effective for the liberation of $SO_x$ gas from the sulfonation additive. Liberation of $SO_x$ gas from the sulfonation additive results in complete or partial sulfonation of the polyolefin matrix under an inert or oxic environment. A particular advantage of this melt-mixing methodology is that the amount of sulfonation of the fiber material can be carefully controlled by precisely quantifying the amount of sulfonation material (e.g., by weight or molar ratio of the sulfonation material with respect to total amount of composite material). In some embodiments, a completely sulfonated fiber exhibits 1 mole of sulfonate or sulfate per mole of polyethylene repeat unit. In some embodiments, a completely sulfonated fiber gains 0.5 moles of sulfonate or sulfate per mole of polyethylene repeat unit, through a diffusion-controlled process.

The sulfonation additive can be any solid-state compound or material bearing reactive $SO_x$-containing groups (typically, —$SO_3H$, or sultone, i.e., —($SO_2$—O)—, or sulfate —(O—$SO_2$—O)— groups) that function to liberate $SO_2$ and/or $SO_3$ under elevated temperatures. In particular embodiments, the sulfonation additive is an organic (i.e., carbon-containing or carbonaceous) sulfonated compound or material. Some examples of organic sulfonated compounds or materials include sulfonated graphene, sulfonated diene rubber, sulfonated polyolefin, polyvinyl sulfate, sulfonated polystyrene, sulfonated lignin, and sulfonated mesophase pitch. Such organic sulfonated compounds are either commercially available or can be produced by methods well known in the art (e.g., by any of the liquid or gas sulfonation processes known in the art, as discussed above). Inorganic non-metallic sulfates, such as ammonium sulfate, ammonium bisulfate, or other such sulfates, can also be used as a sulfonation additive in the precursor matrix. Moreover, to increase compatibility of the additive with the polyolefin polymer, the sulfonation additive (e.g., graphene or other polycyclic aromatic compound or material) may be functionalized with hydrophobic aliphatic chains of sufficient length (e.g., hexyl, heptyl, octyl, or a higher alkyl chain) by methods well known in the art.

In a particular embodiment, the sulfonation additive is elemental sulfur, which can be melt-mixed with polyolefin precursor. The elemental sulfur-mixed polyolefin resin is then spun into fiber or non-woven mat form. Then the precursor, either in mat or filament form, is oxidized, such as in air, ozone, or in oxidizing liquid bath, as described above, to obtain the sulfonated precursor.

In still other embodiments, to produce a sulfonated polyolefin fiber, fibers are produced (e.g., drawn) from a sulfonated polyolefin resin. The sulfonated polyolefin resin can be produced by, for example, sulfonating a polyolefin resin by any of the techniques described above. Fibers can be produced from the sulfonated polyolefin resin by any of the fiber-producing techniques known in the art and as herein described, e.g., by solution spinning, gel-spinning, solvent or plasticizer-assisted melt-spinning, or melt processing.

In another embodiment, completely or partially sulfonated polyolefins are plasticized with a suitable (i.e., plasticizing) solvent, such as dimethyl sulfoxide, dimethyl formamide, an oil (e.g., an inorganic oil, such as silicone oil, or an organic oil, such as vegetable oil) or concentrated or dilute sulfuric acid, at varied dilutions and processed in the form of a gel at low temperature in a coagulation bath to obtain solution-spun completely- or partially-sulfonated fibers. In particular embodiments, sulfonated additives, such as organic sulfonated compounds, are incorporated into the fiber by doping them into the plasticized polymer gel. Sulfonated additives serve as a source of $SO_x$ gas at elevated temperatures and serve as sulfonating agents in an oxic environment.

The period of time (i.e., residence time) that the polyolefin fiber is exposed to the sulfonating species at the sulfonating temperature, as well as the temperature during exposure to the sulfonating species (i.e., sulfonation temperature) can be suitably adjusted to provide a complete sulfonation or a level of sulfonation below a complete sulfonation (i.e., partial sulfonation). In some embodiments, the degree of sulfonation (DS) can be determined or monitored at points during the process by use of thermogravimetric analysis (TGA), dynamic mechanical analysis (DMA), density measuring device, or other suitable analytical technique.

The sulfonation temperature is generally below a carbonization temperature, and more typically, at least 0° C., 10° C., 20° C., 30° C., 40° C., or 50° C., and up to 300° C. In different embodiments, the sulfonation temperature is precisely or about 30° C., 40° C., 50° C., 60° C., 70° C., 80° C., 90° C., 100° C., 110° C., 120° C., 130° C., 140° C., 150° C., 160° C., 170° C., 180° C., 190° C., 200° C., 210° C., 220° C., 230° C., 240° C., 250° C., 260° C., 270° C., 280° C., 290° C., or 300° C., or a sulfonation temperature within a range bounded by any two of the foregoing values (for example, at least or above 30° C., 40° C., 50° C. and up to or less than 200° C., 250° C., or 300° C.; or at least or above 50° C. and up to or less than 160° C., 170° C., or 180° C.; or at least or above 70° C. and up to or less than 120° C., 140° C., 160° C., or 180° C.).

The residence time at sulfonation is very much dependent on several variables, including the sulfonation temperature used, concentration of sulfonating agent in the reaction medium, level of applied tension (if any), crystallinity of the precursor polymer, and the thickness of the polyolefin fiber. The residence time is also dependent on the sulfonation method used (i.e., liquid or gas phase processes). As would be appreciated by one skilled in the art, the degree of sulfonation achieved at a particular sulfonating temperature and residence time can be replicated by use of a higher sulfonation temperature at a shorter residence time, or by use of a lower sulfonation temperature at a longer residence time. Similarly, the residence time required to achieve a degree of sulfonation in a polyolefin fiber of a certain thickness may result in a higher degree of sulfonation in a thinner fiber and a lower degree of sulfonation in a thicker fiber with all other conditions and variables normalized. Generally, for polyolefin fibers having a thickness in the range of 0.5 to 50 microns, a residence time at sulfonation of up to about 90 minutes provides a partial sulfonation (i.e., where sulfonation has not occurred through the entire diameter of the fiber through the core, thus producing a surface-sulfonated polyolefin fiber), whereas a residence time above 90 minutes generally provides a complete sulfonation for the indicated thickness. In different embodiments, depending on such variables as the sulfonation temperature and fiber thickness, the residence time at sulfonation may be suitably selected as precisely, about, up to, or less than 180 minutes, 150 minutes, 120 minutes, 90 minutes, 60 minutes, 30 minutes, 20 minutes, 10 minutes, 5 minutes, or 1 minute, or a residence time within a range bounded by any two of the foregoing values. During sulfonation, a tensile stress of any suitable degree can be employed, such as a tensile stress of 0, 1, 5, 10, or 15 MPa, or within a range thereof. Precursor crystallinity depends on the nature of the polymer and molecular orientation in the fiber form and typically has a value from 0 to 80%.

Generally, for polyolefin fibers having a thickness in the range of 15 to 20 microns, complete sulfonation (i.e., to the core of the fiber) will occur at: a sulfonation temperature of 150° C. or greater when employing a sulfonation residence time of about 5-10 minutes or greater; or a sulfonation temperature of 140° C. or greater when employing a residence time of about 10-15 minutes or greater; or a sulfonation temperature of 130° C. or greater when employing a residence time of about 15-20 minutes or greater; or a sulfonation temperature of 120° C. or greater when employing a residence time of about 20-25 minutes or greater; or a sulfonation temperature of 110° C. or greater when employing a residence time of about 25-30 minutes or greater; or a sulfonation temperature of 100° C. or greater when employing a residence time of about 30-35 minutes or greater; or a sulfonation temperature of 90° C. or greater when employing a residence time of about 35-40 minutes or greater; or a sulfonation temperature of 70° C. or greater when employing a residence time of about 40-45 minutes or greater. Therefore, for any of the foregoing examples, a reduction in sulfonation temperature or residence time should generally have the effect of achieving a partial sulfonation (i.e., a surface sulfonation) for polyolefin fibers having a thickness in the range of 15 to 20 microns.

The above exemplary sulfonation temperatures and residence times are not meant to be taken precisely, but as approximate and typical for polyolefin fibers having a thickness in the range of 15 to 20 microns. For polyolefin fibers having a thickness below the aforesaid range, lower sulfonation temperatures and/or lower residence times may be used to achieve the same effect or if a partial sulfonation is desired; and likewise, for polyolefin fibers having a thickness above the aforesaid range, higher sulfonation temperatures and higher residence times can be used to achieve the same effect, or the same or lower sulfonation temperatures and/or residence times may be used to achieve a partial sulfonation. Moreover, generally, for polyolefin fibers having a thickness in the range of 15 to 20 microns, a residence time at sulfonation of 2 minutes is too short to achieve complete sulfonation (to the core of the fiber) at a sulfonation temperature of 160° C. or less, and a residence time of 1 minute or less is generally too short to achieve complete sulfonation at a sulfonation temperature of 200° C. or less. In particular embodiments, a partially sulfonated tow of filaments of 1 to 30 micron thicknesses is produced by varying one or more of the above parameters. The foregoing exemplary combinations of sulfonation temperatures and residence times are particularly relevant to liquid phase and gas phase sulfonation processes described above.

In particular embodiments, a partial sulfonation process is employed on the polyolefin fibers. Particularly when a liquid phase or gas phase sulfonation process is used, the partial sulfonation process results in a surface-sulfonated polyolefin fiber (i.e., which possesses an unsulfonated core). The surface-sulfonated polyolefin fiber is achieved by judicious selection of sulfonation temperature and residence time, appropriate for the fiber thickness, that halts sulfonation before the entire diameter of the fiber through the core becomes sulfonated. Generally, this is achieved by limiting the residence time at a particular sulfonation temperature to a time below that which would result in complete sulfonation through the core. Moreover, by adjusting the residence time, the thickness of the unsulfonated core and sulfonated surface can be correspondingly adjusted. For example, increasing the residence time at a particular sulfonation temperature would have the effect of thickening the sulfonated surface and narrowing the unsulfonated core, while decreasing the residence time at a particular sulfonation temperature would have the effect of narrowing the sulfonated surface and thickening the unsulfonated core. Unsulfonated portions will volatilize and sulfonated portions will carbonize during carbonization. Thus, as further discussed below, this ability to carefully adjust sulfonated surface and unsulfonated core thicknesses is highly advantageous in producing hollow carbon fibers (i.e., after a carbonization step) having precise carbon wall thicknesses and hollow core diameters.

If desired, the thickness of the sulfonated surface and unsulfonated core can be further adjusted by including an autocatalytic solid-state desulfonation-sulfonation step (i.e., "desulfonation step" or "desulfonation process") at the interface of the sulfonated sheath and unsulfonated core (i.e., "sheath-core interface"). During the desulfonation-sulfonation process, the aforesaid interface gradually propagates towards the core. In the desulfonation process, the surface-sulfonated polyolefin fiber is heated to a desulfonation temperature effective for the liberation of $SO_x$ gas from the sulfonated surface. As the sulfonated sheath is rigid and becomes crosslinked after desulfonation, in the sulfonation phase, $SO_x$ gas molecules liberated from the surface migrate toward the core, thereby partially sulfonating additional polymeric material toward the core. This results in a narrower unsulfonated core and thicker sulfonated surface, or eventually, partial sulfonation throughout the fiber including through the core. The higher the temperature and the longer the residence time at the desulfonation temperature, the narrower the unsulfonated core and the thicker the crosslinked sheath. In some embodiments, the desulfonation temperature is employed for a period of time less than the time required for the entire polyolefin fiber to be partially sulfonated through the core. The instant application also includes the possibility of employing a desulfonation step for a period of time effective to partially sulfonate the polyolefin fiber through the core. In the foregoing embodiment, no unsulfonated core remains.

When a desulfonation process is employed, the desulfonation temperature can independently be selected from any of the sulfonation temperatures and residence times provided above (e.g., at least 30° C., 40° C., 50° C., 60° C., or 70° C., and up to or less than 120° C., 140° C., 160° C., 180° C., 200° C., 250° C., or 300° C.). Moreover, a desulfonation (inverse sulfonation) process is generally practiced herein in the absence of an external sulfonating source, thereby not further adding sulfonating species to the fiber, but limiting the amount of sulfonating species to the amount present in the sulfonated surface or the amount incorporated into polymer fiber for a melt-mixed fiber. The desulfonation process is generally practiced herein in an oxygen-containing (i.e., $O_2$-containing or oxic) environment, such as air or an artificial oxygen-inert gas atmosphere, which may be conducted at either standard pressure (e.g., 0.9-1.2 bar), elevated pressure (e.g., 2-10 bar), or reduced pressure (e.g., 0.1-0.5 bar). In other embodiments, a pressure of precisely, about, or at least 0.1, 0.2, 0.5, 1, 2, 3, 4, 5, 6, 7, 8, 9, or 10 bar, or a pressure within a range therein, is employed.

In some embodiments, the sulfonation and/or desulfonation process includes exposing the fiber (before, during, and/or after the sulfonation or desulfonation process) to radiative energy. The radiative energy can be, for example, electromagnetic radiation (e.g., ultraviolet, X-ray, infrared, or microwave radiation) or energetic particles (e.g., electron or neutron beam). In the case of electromagnetic radiation, the radiation may be dispersed or collimated, as in a laser. In some embodiments, the radiative energy is ionizing, while in other embodiments it is not ionizing. The fiber may alternatively or additionally be exposed to radiative energy before, during, or after sulfonation and/or carbonization. In some embodiments, electromagnetic or energetic particle radiation is not employed.

In some embodiments, the sulfonation and desulfonation processes are practiced without applying a stress (tension) along the length of the fiber. In other embodiments, either the sulfonation or desulfonation process, or both, are practiced by applying a stress along the fiber length. The stress can be applied to, for example, avoid fiber shrinkage. In particular embodiments, a high degree of axial stress (e.g., 10 MPa or higher) is applied when a small pore size and narrow pore size distribution is desired. In some embodiments, 0, 0.1, 0.3, 0.5, 1, 2, 5, 10, or 20 MPa of stress is applied in each step involving sulfonation, desulfonation, and carbonization to obtain a desired morphology in the carbonized fiber.

In the case of a non-woven mat or paper preform of surface-sulfonated polyolefin fiber having an unsulfonated core, subsequent carbonization volatilizes the unsulfonated core portion to provide a hollow core portion, and carbonizes the surface-sulfonated portion to provide a carbon wall portion. The end result is, thus, a hollow carbon fiber having a hollow core surrounded by a carbon wall. As discussed above, the carbon wall thickness and hollow core diameter can both be precisely adjusted by correspondingly adjusting the sulfonated surface thickness and unsulfonated core thickness during the sulfonation step. In this way, hollow carbon fibers possessing a tailored combination of carbon wall thickness and hollow core diameter can be produced. Such tailoring is highly advantageous for the reason that different applications have different requirements. For example, some applications may require a porous material (e.g., as a filtration material or catalytic support) that also requires high strength, which can be provided by a thicker carbon wall. Other applications not requiring such high strength may use thinner carbon walls. Moreover, some applications (e.g., filtration and gas adsorption) may be better served by thinner pore channels than others, and vice-versa. Depending on the initial thickness of the polyolefin fiber, the carbon wall thickness and hollow core portion can be independently selected to be any desired thickness. Depending on the application, the carbon wall thickness and hollow core portion can be independently selected as, for example, 0.1, 0.2, 0.5, 1, 2, 5, 10, 15, 20, 30, 40, 50, 60, 70, 80, 90, or 100 microns, or a thickness within a range bounded by any two of these values.

In the case of a non-woven mat or paper preform of partially-sulfonated polyolefin fiber that has been partially sulfonated throughout (e.g., in the case of a melt-mixed composite fiber precursor, or a surface-sulfonated polyolefin fiber that has undergone desulfonation to the extent that the fiber is partially sulfonated throughout), subsequent carbonization results in solid carbon fibers enmeshed as a non-woven mat or paper. A particular advantage in using the partial sulfonation process described herein for producing solid carbon fibers is the ability to adjust such properties as carbon yield and carbon fiber properties (e.g., strength, brittleness, and fracture toughness) by appropriate adjustment in the level of sulfonation. Moreover, as sulfonation of fibers held in a tow is known in the art to cause undesired interfilament bonding via hydrogen bonding, the described partial sulfonation process can to some extent reduce interfilament bonding between fibers by adjusting the degree of sulfonation and/or preventing free sulfuric acids or sulfonating agents from being on the surface. Water washing followed by drying (preferably at less than 120° C.) helps to reduce interfilament bonds. Interfilament bonding can then be re-established when it is needed, i.e., at the time of forming the non-woven mat or paper preform, by methods described above.

Production of hollow carbon fiber by carbonization of surface-sulfonated polyolefin fiber, described above, will generally result in a hollow channel along the length of the fiber (otherwise referred to as a hollow core or hollow portion) having a circular shape. The term "circular", as used herein, may mean perfectly or substantially circular (i.e., an aspect ratio of precisely 1 or about 1), or circle-like, such as ovoid (e.g., an aspect ratio of up to 1.5, 2, 3, 4, or 5). Although such circular-shaped hollow carbon fibers are highly useful for several applications, the non-woven mat or paper can be composed of hollow carbon fibers having any of a variety of non-circular (complex) cores, such as polygonal-shaped and other complex-shaped cores. Some examples of complex hollow cores or outer surfaces include polygonal (e.g., triangular, square, rectangular, pentagonal, hexagonal, octagonal), polylobal (e.g., trilobal, tetralobal, pentalobal), gear-shaped, and star-shaped cores and outer surfaces. The non-woven mat or paper can alternatively be composed of solid or hollow carbon fibers that have a complex-shaped outer surface. Moreover, doping with inorganic catalytic species during precursor fiber processing can produce patterned or non-patterned catalyst or catalyst support media.

Such complex-shaped carbon fibers, as well as materials made therefrom (e.g., woven or non-woven mats) can be particularly useful or advantageous for numerous applications, including, for example, catalysis, gas absorption, gas separation, water desalination, composite reinforcement, and carbon capturing, and as structural electrodes and current collector materials in composite batteries or energy storage applications. The instant method can advantageously produce carbon fiber mats and paper wherein the carbon fiber can be solid or hollow and can possess any of a wide variety of complex shapes on the outer surface and/or inner hollow surface. Moreover, the process can be performed on an industrial scale by continuous and integrated processing and relatively straight-forward assembly methods.

By a first methodology, production of hollow carbon fiber having a circular- or complex-shaped hollow core begins with a multi-component (for example, bi-, tri-, and tetra-component) polymer fiber composite. The multi-component polymer fiber composite contains a sulfonated outer layer and an unsulfonated core having a circular or complex shape. Intermediate layers may or may not be situated between the outer layer and core. In the multi-component polymer fiber composite, the outer layer, core, and any one or more intermediate layers are bonded or otherwise adhered to each other with a clearly demarcated boundary between layers. For purposes of the instant invention, the clearly demarcated boundary between layers is preferably a result of a multi-component extrusion process involving melts of distinct elongational viscosities that do not allow significant diffusion at the interface, wherein two or more different polymer compositions are extruded together for incorporation as a heterogeneous composite in a single fiber. The multi-component polymer fibers are then bonded into a preform by methods described above.

Multi-component (e.g., bi-component and tri-component) extrusion processes capable of providing a wide variety of complex shapes for each component are well known in the art, as described, for example, in U.S. Pat. No. 6,551,353, the contents of which are herein incorporated by reference. In particular, as is well known in the art, a multi-component extrusion process operates, generally, by flowing polymer melts or solutions of different polymer components having distinct elongational rheology characteristics through a designed orifice to form co-extruded or co-ejected filaments. The polymer components are generally immiscible with each other, and moreover, one of the components is generally sulfonated (or capable of being sulfonated, i.e., sulfonable, in order to be subsequently sulfonated) in order to be carbonized, while the other component is not sulfonated (or not capable of being sulfonated, i.e., not sulfonable) in order to be volatized to form the core. In some embodiments, the sulfonable component is sulfonated (either completely or partially sulfonated) prior to being extruded with the unsulfonated component in the multi-component extrusion process. Preferably, at least the sulfonated outer layer has a polyolefin or polyolefin-derivative composition, and is processed in plasticized form or gel to avoid a thermally-induced desulfonation during extrusion. The unsulfonated complex-shaped core to be volatilized during carbonization can be composed of any thermally removable (vaporizable) material. In preferred embodiments, the unsulfonated complex-shaped core has a composition different from the polymer of the outer layer, and more preferably, a composition that is substantially more vaporizable than the polymer of the outer layer before sulfonation. In particular embodiments, the unsulfonated complex-shaped core (i.e., thermally removable material) has a biopolymeric composition, particularly a biopolyester type of composition, such as polylactic acid (PLA, PLLA, or PDLA), polyglycolic acid (PGA), and polycaprolactone (PCL). In other embodiments, the thermally removable material has a polyalkylene oxide (e.g., polyethylene oxide) composition. The unsulfonated complex-shaped core may also be composed of any of a variety of other volatile polymeric materials, or a volatile solid non-polymeric material, such as a wax, or a compound, such as naphthalene.

By a second methodology, hollow carbon fiber having a circular- or complex-shaped hollow core is produced by a modification of the first methodology, described above, the modification being that the circular- or complex-shaped core portion in the multi-component polymer fiber composite is selected as a fugitive material. Preferably, the fugitive material is a compound or polymer that can be readily dissolved in a solvent. The fugitive material may be any of the materials described above for thermally removable materials. The ready removability of the fugitive core material is to be contrasted with the non-fugitive (i.e., non-removable) outer polymer layer to be carbonized. In particular embodiments, a multi-component extrusion process is used to produce a multi-component polymer fiber composite in which an unsulfonated non-fugitive polyolefin outer layer is adhered (either in the absence or presence of one or more intermediate layers) with a circular- or complex-shaped unsulfonated fugitive core. The fugitive core is removed in a fugitive removal step, e.g., by dissolution by contact with a dissolving solvent (e.g., an organic solvent, such as tetrahydrofuran, methylene chloride, acetone, or an alcohol, or an aqueous sodium or potassium hydroxide solution,) that does not also dissolve or adversely change the polyolefin, or by thermal vaporization, or by chemical reaction to produce a gas. The fugitive core may be removed prior to or after bonding the multi-component polymer fiber composite as a preform. After removing the fugitive core, the result is a hollow polyolefin fiber possessing a hollow core having the circular or complex shape of the removed fugitive material. The hollow polyolefin fiber is then completely or partially sulfonated, as described above, either prior to or after forming the fibers into a bonded preform. When the sulfonated hollow fiber in the preform is subjected to a carbonization step, the sulfonated hollow fiber is converted to a hollow carbon fiber having the same or substantially same core shape as the sulfonated hollow fiber.

By a third methodology, the carbon fibers in the carbon non-woven mat or paper are made to have a circular- or complex-shaped outer surface. By a particular embodiment, the circular- or complex-shaped carbon fiber is produced by a modification of the first methodology, described above, the modification being that material selections for the core portion and outer layer are reversed in the multi-component polymer fiber composite. The result is a multi-component polymer fiber composite having a circular- or complex-shaped (e.g., polygonal-shaped) sulfonated polyolefin core and an unsulfonated outer layer. Carbonization of the foregoing multi-component polymer fiber composite results in volatilization of the unsulfonated outer layer along with carbonization of the sulfonated polyolefin core to produce carbon fiber having a circular- or complex-shaped outer surface. By a further modified methodology, similar to the second methodology described above, the multi-component polymer fiber composite can be constructed of a non-fugitive polymer core having a circular or complex shape and a fugitive outer layer, wherein the non-fugitive core and fugitive outer layer are adhered or bonded directly with each other, or indirectly, via intermediate layers. A fugitive removal step is used to remove the fugitive outer layer. The resulting circular- or complex-shaped polyolefin core is subjected to a complete or partial sulfonation step, either before or after forming the bonded preform, and the bonded preform subjected to a carbonization step to produce a non-woven mat or paper made of bonded carbon fibers possessing a circular- or complex-shaped outer surface. A particular advantage of this methodology is that it can produce very small diameter filaments (e.g., up to or less than 10 micron diameters, and sub-micron diameters) of polyolefin or sulfonated polyolefin. Using conventional means, it is generally highly difficult to produce such small diameter continuous filaments of polyolefin or sulfonated polyolefin. An exemplary embodiment of the above-described alternative methodology is schematically depicted in FIG. 1. The bicomponent fiber depicted in FIG. 1 also generally depicts some of the different core shapes and outer layer shapes possible via multi-component extrusion technology.

For carbon fibers having a circular- or complex-shaped outer surface, as described above in the third methodology, a method is provided for further including a hollow core. Thus, in particular embodiments, the carbon fiber possesses a complex-shaped (e.g., polygonal) outer surface and a circular hollow core. Such a combination of features can be attained by modifying the multi-component polymer fiber to have a sulfonated core portion that is surface-sulfonated, i.e., with an unsulfonated inner core portion of the sulfonated core. Thus, after removal of the outer layer, either by volatilization or by a fugitive removal step, the carbonization step causes the surface-sulfonated portion of the sulfonated core to be carbonized and the inner core portion to be volatilized. In other embodiments, a complex-shaped hollow core may be included in a carbon fiber having a complex-shaped outer surface by employing a three-component precursor fiber having a thermally removable or fugitive outer layer, and a core portion containing a complex-shaped outer core portion made of a polyolefin and a complex-shaped inner core portion made of a thermally removable or fugitive material. On subjecting the three-component precursor fiber to thermal treatment or a fugitive removal step, both the outer layer and inner core are both removed, leaving the outer core portion, which can then be sulfonated (if not already sulfonated) and carbonized to produce a carbon fiber having a complex-shaped outer surface and complex-shaped hollow core. In other embodiments, a hollow core can be created in the fiber during fiber manufacturing, when the outer sheath is a fugitive polymer, the outer core is a polyolefin or sulfonated polyolefin, and the inner core is hollow (e.g., air). Such hollow filament manufacturing using multi-component fiber spinning is known in the art. The above-described methods can advantageously provide small diameter hollow carbon fibers and precursors thereof having a complex shape.

In most embodiments, the multi-component extrusion process described above incorporates a single removable core component per fiber. However, by methods available to those skilled in the art, modifications can be made to the multi-component extrusion process in order to produce a composite polymer fiber having more than one (e.g., two, three, four, or a higher multiplicity) removable component along the length of the fiber. Subsequent carbonization of such a composite polymer fiber results in a carbon fiber containing more than one hollow channel along the length of the fiber.

The method described herein may further include a process for producing the unsulfonated polyolefin fiber precursor. The polyolefin fiber precursor (i.e., "polyolefin fiber") can be produced by any of the methods known in the art. In some embodiments, the fiber precursor is produced by any of the melt-processing techniques known in the art. The melt-processing technique can be, for example, a melt-spinning (i.e., melt-extrusion or electrospinning) or melt-blowing process. In other embodiments, the fiber precursor is produced by a solution-spinning process, wherein fiber is produced by coagulation of solid fiber from solution of the polymer in a solvent. The conditions and methodology employed in melt-processing and solution-spinning processes are well-known in the art. Moreover, the fiber precursor may be produced by a single, bi-, or higher multi-component extrusion process. The conditions and methodology employed in single or multi-component extrusion processes are also well-known in the art as also described above.

The polyolefin fiber precursor can be composed of any polyolefin. The polyolefin is typically thermoplastic and/or elastomeric, but may also be a thermoset if sufficiently crosslinked. As used herein, the term "polyolefin" refers to any polymer produced by addition polymerization of an unsaturated hydrocarbon. The unsaturated hydrocarbon considered herein is generally composed exclusively of carbon and hydrogen and precisely or at least one carbon-carbon double bond. In some embodiments, one or more hydrogen atoms of the hydrocarbon may be replaced with a heteroatom-containing group, such as one or more halogen atoms, hydroxyl groups, amino groups, ether groups, thiol groups, thioether groups, or aldehyde groups. The heteroatom-containing group may also interrupt a carbon-carbon bond, as in the case of a carbonyl (CO), oxygen atom (—O—), sulfur atom (—S—), or any of the above exemplary groups, where applicable (e.g., an amino group linking two or three carbon atoms). Some examples of unsaturated hydrocarbons useful for producing respective addition polymers include ethylene, propylene, 2-butene, 2-methylpropene, butadiene, styrene, fluoro-substituted versions thereof, and copolymers thereof. The polyolefin may itself be either saturated or unsaturated.

The polyolefin is typically polyethylene, polypropylene, or a homogeneous or heterogeneous composite thereof, or a copolymer thereof. In the case of polyethylene, the polyethylene can be any of the types of polyethylene known in the art, e.g., low density polyethylene (LDPE), linear low density polyethylene (LLDPE), very low density polyethylene (VLDPE), high density polyethylene (HDPE), medium density polyethylene (MDPE), high molecular weight polyethylene (HMWPE), and ultra high molecular weight polyethylene (UHMWPE). In the case of polypropylene, the polypropylene can also be any of the types of polypropylenes known in the art, e.g., isotactic, atactic, and syndiotactic polypropylene. The polyolefin precursor may or may not also be derived from, or include segments or monomeric units of other addition monomers, such as acrylic acid, methacrylic acid, methyl acrylate, methyl methacrylate, vinyl acetate (as well as partially or fully hydrolyzed derivatives of vinyl acetate, such as vinyl alcohol), and acrylonitrile, except that the polyolefin precursor preferably does not include these other addition monomers in more than an equal amount by monomer number or weight.

The polyolefin fiber precursor (and corresponding carbon fiber) can have any desired thickness (i.e., diameter). In different embodiments, the fiber can have a thickness of precisely, about, up to, less than, or above, for example, 0.05, 0.1, 0.2, 0.5, 1, 2, 5, 10, 15, 20, 30, 40, 50, 60, 70, 80, 90, or 100 microns, or a thickness within a range bounded by any two of these values. In some embodiments, the fiber is in the form of a tow, while in other embodiments the fiber is in the form of a single filament. Continuous filaments or tows from very low count (<500) to very high counts (>50 k) are considered herein. Such fibers may also be stapled or chopped (i.e., short-segment or discontinuous).

In the method, a non-woven mat or paper preform made of a plurality of bonded sulfonated polyolefin fibers is carbonized to form a non-woven mat or paper made of bonded carbon fibers. The carbonization step includes any of the conditions, as known in the art, that cause carbonization of the partially sulfonated polymer fiber. Generally, in different embodiments, the carbonization temperature can be precisely, about, or at least 300° C., 350° C., 400° C., 450° C., 500° C., 550° C., 600° C., 650° C., 700° C., 750° C., 800° C., 850° C., 900° C., 950° C., 1000° C., 1050° C., 1100° C., 1150° C., 1200° C., 1250° C., 1300° C., 1350° C., 1400° C., 1450° C., 1500° C., 1600° C., 1700° C., or 1800° C., or a temperature within a range bounded by any two of the foregoing temperatures. The amount of time that the completely or partially sulfonated polyolefin fiber is subjected to the carbonization temperature (i.e., carbonization time) is highly dependent on the carbonization temperature employed. Generally, the higher the carbonization temperature employed, the shorter the amount of time required. In different embodiments, depending on the carbonization temperature and other factors (e.g., pressure), the carbonization time can be, for example, about, at least, or no more than 0.02, 0.05, 0.1, 0.125, 0.25, 0.5, 1, 2, 3, 4, 5, 6, 7, 8, 9, 10, 11, or 12 hours, or within a range therein. In particular embodiments, it may be preferred to gradually raise the temperature at a set or varied temperature ramp rate (e.g., 5° C./min, 10° C./min, or 20° C./min). In particular embodiments, it may be preferred to pass the sulfonated preform through a furnace with a gradient of temperature at the entrance and exit of the furnace and at a set temperature inside the furnace in order to achieve the desired residence time. In other embodiments, it may be preferred to subject the sulfonated preform to a sudden (i.e., non-gradual) carbonization temperature. In some embodiments, after the sulfonated preform is subjected to a desired carbonization temperature for a particular amount of time, the temperature is reduced either gradually or suddenly.

If desired, the sulfonated preform, or alternatively, the carbonized non-woven mat or paper, can be subjected to a temperature high enough to produce a graphitized non-woven mat or paper. Typically, the temperature capable of causing graphitization is a temperature of or greater than about 2000° C., 2100° C., 2200° C., 2300° C., 2400° C., 2500° C., 2600° C., 2700° C., 2800° C., 2900° C., 3000° C., 3100° C., or 3200° C., or a temperature within a range bounded by any two of these temperatures.

Typically, the carbonization or graphitization step is conducted in an atmosphere substantially devoid of a reactive gas (e.g., oxygen or hydrogen), and typically under an inert atmosphere. Some examples of inert atmospheres include nitrogen ($N_2$) and the noble gases (e.g., helium or argon). The inert gas is generally made to flow at a specified flow rate, such as 0.1, 0.25, 0.50, 1, 5, 10, 20, or 30 L/min. However, for high volume industrial manufacturing, the inert gas flow rate can be much higher, such as 50 L/min, 100 L/min, 500 L/min, 1000 L/min, or even several thousands of L/min. However, one or more reactive functionalizing species may be included in the carbonization step or in a post-treatment step (e.g., at the exit of the furnace as a post-carbonization step) to suitably functionalize the carbon fiber, e.g., by inclusion of a fluorocarbon compound to induce fluorination, or inclusion of an oxygen-containing species to induce oxygenation (to include, e.g., hydroxy or ether groups), or inclusion of amino-, thio-, or phosphino-species to aminate, thiolate, or phosphinate the carbon fiber. Thus, in some embodiments, it may be preferred to include at least one reactive gas, such as oxygen, hydrogen, ammonia, an organoamine, carbon dioxide, methane, a fluoroalkane, a phosphine, or a mercaptan. The one or more reactive gases may, for example, desirably change or adjust the compositional, structural, or physical characteristics of the carbon fiber. The functionalized groups on the carbon fiber can have a variety of functions, e.g., to bind to metal species that are catalytically active, or to modify or adjust the surface miscibility, absorptive, or wetability characteristics, particularly for gas absorption and filtration applications.

The pressure employed in the carbonization (or graphitization) step is typically ambient (e.g., around 1 atm). However, in some embodiments it may preferred to use a higher pressure (e.g., above 1 atm, such as 1.5, 2, 5, 10, 20, 50, or 100 atm, or within a range therein) to, for example, maintain a positive pressure inside the furnace and keep the sample free of oxygen at high temperature to avoid combustion or partial combustion. In other embodiments, it may be preferred to use a lower pressure (e.g., below 1 atm, such as 0.5, 0.1, 0.05, or 0.01 atm, or within a range therein).

In some embodiments, non-woven mat, paper, or film made of carbon fibers are activated using state-of-the-art processes for preparing activated carbon fibers (e.g., $CO_2$ or steam activation) to generate an activated carbon mat from bonded polyolefin nanofibers, fibers, or complex-shaped fibers or their sulfonated derivatives. Polyolefin-derived activated carbon mats have numerous applications, including, for example, sorbents for gases, as well as separation and energy storage materials.

The term "carbon" used herein refers to any form of carbon, including amorphous, graphitic, crystalline, and semi-crystalline forms of carbon. In some embodiments, the carbon fiber may have characteristics of a single type of carbon structure throughout the fiber, while in other embodiments, the carbon fiber may have two or more types of carbon structure, e.g., a more pronounced graphitic structure on the outer surface of the carbon fiber and a more pronounced amorphous structure below the surface or in inner layers of the carbon fiber.

The carbon fiber may be non-porous or porous, for both solid and hollow carbon fibers. For carbon fibers that are porous, the porosity considered herein is a result of pores on outer and/or inner surfaces (or layers) of the carbon fiber, typically approximately perpendicular to the length of the fiber or substantially non-parallel to the length of the fiber. For a solid (i.e., non-hollow) carbon fiber, the pores may be on the outer surface (or core segments), and for hollow carbon fibers, the pores may be on the inner surface (i.e., surrounding hollow core). In embodiments where the filaments are made from an already-sulfonated precursor at the core surrounded by a sheath of unsulfonated polymer, a porous structure can be created on the outer layer or surface. The pores may be mesopores, micropores, or macropores, or a combination thereof. Generally, for hollow carbon fibers, the pores are substantially smaller than the diameter of the hollow core (e.g., no more than 5%, 10%, or 20% of the hollow core diameter).

As used herein and as understood in the art, the terms "mesopores" and "mesoporous" refer to pores having a size (i.e., pore diameter or pore size) of at least 2 nm and up to 50 nm, i.e., "between 2 and 50 nm", or "in the range of 2-50 nm". In different embodiments, the mesopores have a size of precisely or about 2 nm, 2.5 nm, 3 nm, 3.5 nm, 4 nm, 4.5 nm, 5 nm, 5.5 nm, 6 nm, 6.5 nm, 7 nm, 7.5 nm, 8 nm, 8.5 nm, 9 nm, 9.5 nm, 10 nm, 11 nm, 12 nm, 15 nm, 20 nm, 25 nm, 30 nm, 35 nm, 40 nm, 45 nm, or 50 nm, or a particular size, or a variation of sizes, within a range bounded by any two of these values.

As used herein and as understood in the art, the terms "micropores" and "microporous" refer to pores having a diameter of less than 2 nm. In particular embodiments, the micropores have a size of precisely, about, up to, or less than 0.5, 0.6, 0.7, 0.8, 0.9, 1.0, 1.1, 1.2, 1.3, 1.4, 1.5, 1.6, 1.7, 1.8, or 1.9 nm, or a particular size, or a variation of sizes, within a range bounded by any two of these values.

As used herein, the terms "macropores" and "macroporous" refer to pores having a size of at least 60 nm. Generally, the macropores considered herein have a size up to or less than 1 micron (1 μm). In different embodiments, the macropores have a size of precisely, about, at least, or greater than 60 nm, 65 nm, 70 nm, 75 nm, 80 nm, 85 nm, 90 nm, 95 nm, 100 nm, 110 nm, 120 nm, 130 nm, 140 nm, 150 nm, 160 nm, 170 nm, 180 nm, 190 nm, 200 nm, 225 nm, 250 nm, 275 nm, 300 nm, 325 nm, 350 nm, 375 nm, 400 nm, 425 nm, 450 nm, 475 nm, 500 nm, 550 nm, 600 nm, 650 nm, 700 nm, 750 nm, 800 nm, 850 nm, 900 nm, 950 nm, or 1000 nm, or a particular size, or a variation of sizes, within a range bounded by any two of these values.

Figure 2A:
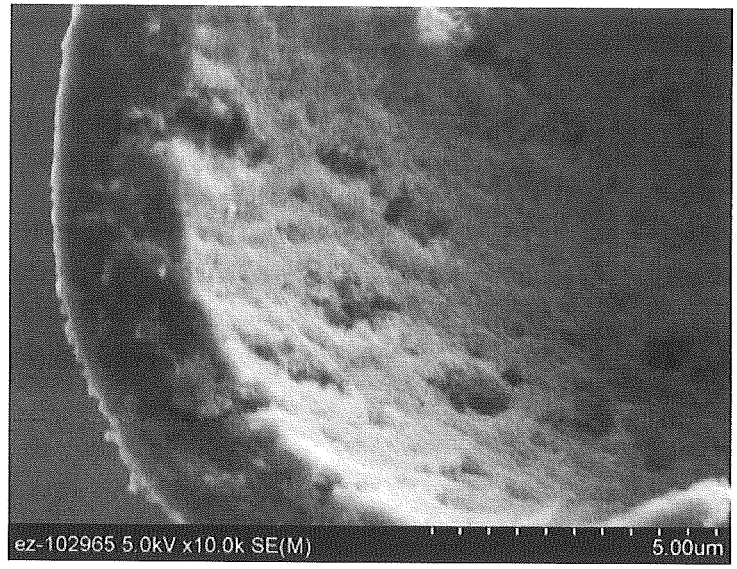
FIGS. 2A-2B. Scanning electron microscopy (SEM) image of the hollow carbonized fibers made from partially sulfonated filaments of polyolefins with sulfonated sheath and nonsulfonated core exhibiting porous inner surface (FIG. 2A) or porous core (FIG. 2B) depending on the degree of sulfonation.
Figure 2B:
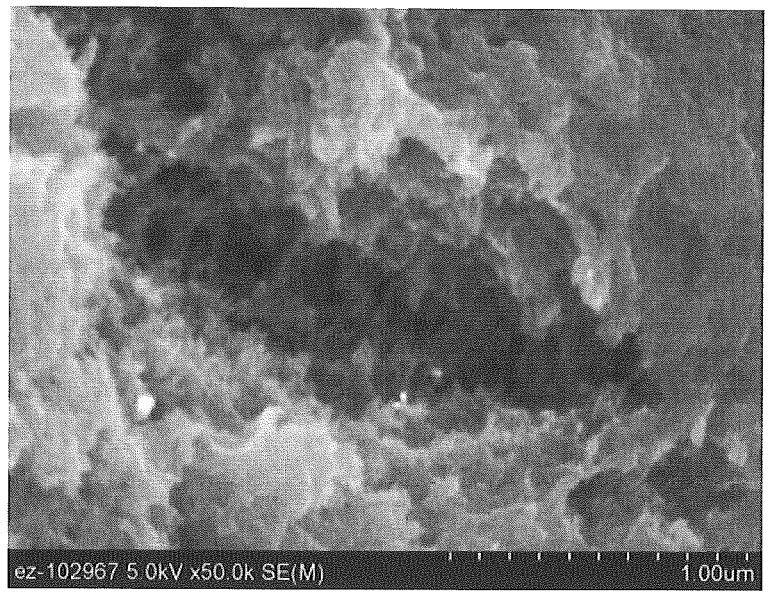

The carbon fiber or non-woven mat or paper form thereof may also have any suitable surface area, which is very much affected by the level of porosity. In different embodiments, the carbon fiber or non-woven mat or paper form thereof may have a surface area of precisely, about, at least, greater than, or up to, for example, 5 $m^2/g$, 10 $m^2/g$, 15 $m^2/g$, 20 $m^2/g$, 30 $m^2/g$, 40 $m^2/g$, 50 $m^2/g$, 60 $m^2/g$, 70 $m^2/g$, 80 $m^2/g$, 90 $m^2/g$, 100 $m^2/g$, 150 $m^2/g$, 200 $m^2/g$, 250 $m^2/g$, 300 $m^2/g$, 350 $m^2/g$, 400 $m^2/g$, 450 $m^2/g$, 500 $m^2/g$, 600 $m^2/g$, 700 $m^2/g$, 800 $m^2/g$, 900 $m^2/g$, or 1000 $m^2/g$, or a surface area within a range bounded by any two of the foregoing values. Hollow filaments made from partially sulfonated filaments of polyolefins with sulfonated sheath and nonsulfonated core can have exceptionally high surface areas by virtue of the porous inner surface (FIG. 2A) or porous core (FIG. 2B).

The instant invention also includes embodiments wherein the mat, paper, or film includes long channels either as hollow cores in carbonized filaments or as interstitial (i.e., interfilament) channels formed as a result of interfilament packing. The channels can have a diameter or width of, for example, up to a few microns, (e.g., 1, 5, 10 or 20 µm) or in the sub-micron range (e.g., 5, 10, 20, 50, 100, 200, or 500 nm). The length of the channels can be the same as the length of the carbon fibers or equivalent to a dimension of the mat, paper, or film, or a fraction thereof. Such porous carbon mats, paper, or film can be particularly useful for separation methods where capillary action is important.

In some cases, the carbon fiber, as produced above, may exhibit less than desirable strength due to partial oxidation of graphitic structures. In such cases, the non-woven mat or paper made of carbon fibers can be subjected to a reduction process to remove all or a portion of oxidized sites. In particular embodiments, the carbon fiber is treated with a chemical reducing agent (e.g., hydrazine, hydrogen gas, borohydride, or a reducing metal) under standard or elevated temperature conditions. The reduction process generally results in a stronger carbon fiber.

In some embodiments, the non-woven mat, paper, or film made of carbon fibers contains only carbon fibers. In other embodiments, the non-woven mat or paper made of carbon fiber may or may not include other types of fiber (e.g., glass or metal), a bonding agent, a matrix (which may or may not also be composed of a form of carbon), or a coating on the carbon fibers.

In other aspects, the invention is directed to articles and devices in which the preform or non-woven mat or paper made of carbon fibers can be incorporated. Some examples of articles and devices in which the preform or non-woven mat or paper made of carbon fibers can be incorporated include gas separation membranes, gas adsorption devices, water filtration and purification devices, water desalination devices, electrodes, catalysts, charge storage devices (e.g., capacitors and supercapacitors), smoke filters (e.g., cigarette filters), and high-strength and/or heat-resistant structural articles, moldings, and compositions, such as polymer, plastic, textile, fabric (e.g., a garment), cellulose (e.g., paper, wood, or cardboard), glass, metal, concrete, clay, and ceramic composites of the non-woven mat or paper made of carbon fibers.

Since the sulfonated and partially-sulfonated precursor compositions described above generally possess some degree of ionic conductivity and some of the controlled desulfonated-polyolefin yield conjugated polymer and those are generally flexible, they are herein considered for use in applications requiring such a combination of properties, such as in electronic or semiconductor devices, including flexible electronics and printed circuit boards.

Examples have been set forth below for the purpose of illustration and to describe certain specific embodiments of the invention. However, the scope of this invention is not to be in any way limited by the examples set forth herein.

EXAMPLE 1

Production of a Non-Woven Mat Made of Carbon Fibers from LLDPE Fiber Precursor by Hydrogen Bonding Self-Assembly of Sulfonated Fibers Preparation of LLDPE Fibers Linear low-density polyethylene (LLDPE) was spun into fibers with varied diameters ranging from 0.25 to 20 µm by conventional melt-spinning using both single and bi-component extrusion processes. For bi-component spinning, polylactic acid (PLA) resin was used as the second (fugitive) component dissolved in a continuous operation using a tetrahydrofuran solvent bath at 50° C. Depending on the degree of molecular orientation, LLDPE fibers had a crystallinity of 50-60% and a tensile strength of 100-170 MPa when tested at 25° C. and at 3 mm/min strain rate for 25.4 mm-long single filament specimens on a MTS tensile tester. Bicomponent (i.e., "islands in a sea") spun strands of LLDPE islands were mostly undrawn filaments which were subsequently stretched at 50° C. to reduce the diameter. The final filaments of LLDPE of 0.2, 0.5, 1, 2, and 20 µm were produced by controlling the feed ratio during bicomponent spinning.

Sulfonation

Figure 3:
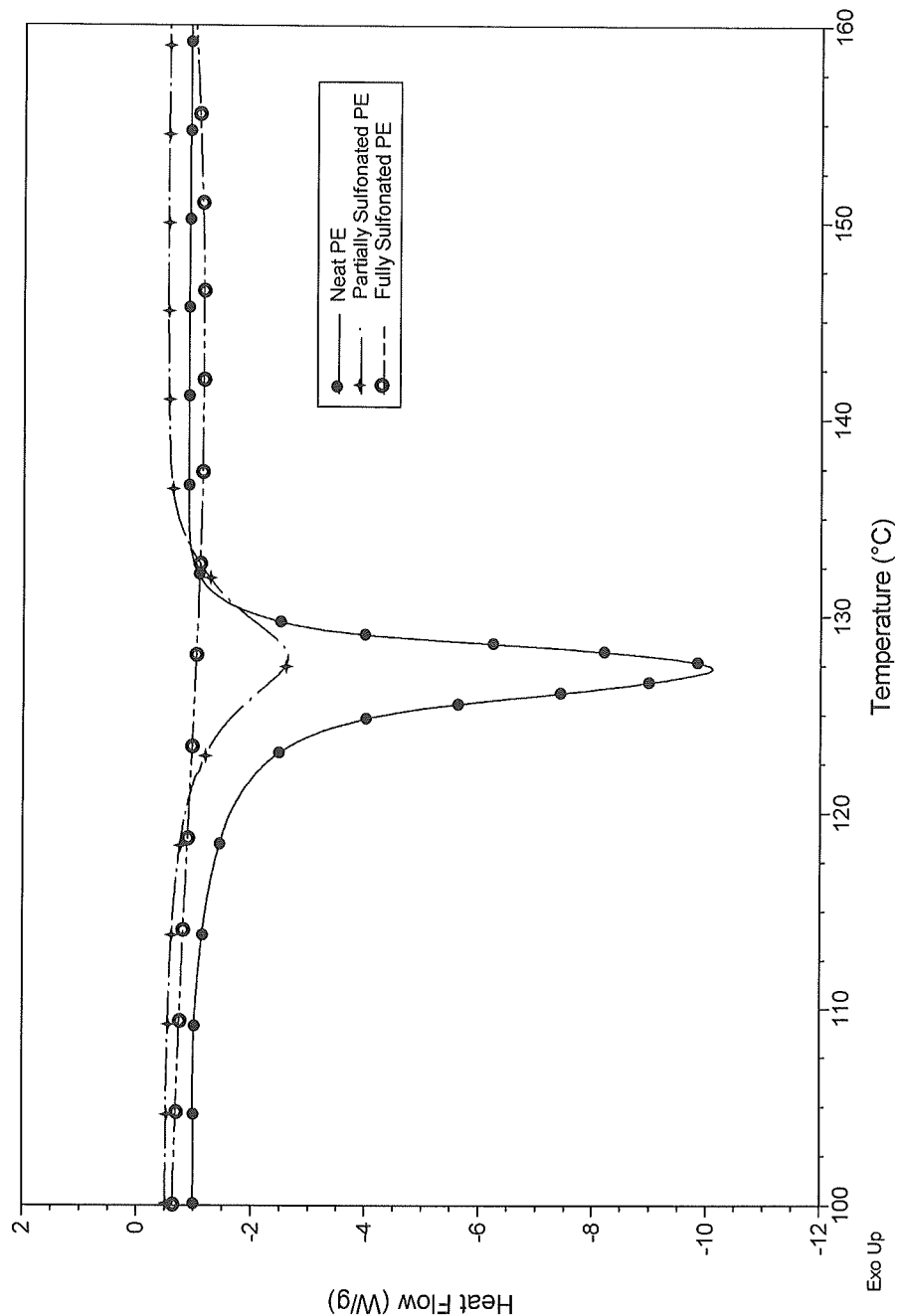
FIG. 3. Differential scanning calorimetry (DSC) thermograms showing melting endotherms of neat and partially sulfonated LLDPE fibers and lack of melting endotherms in fully sulfonated filaments. Partial sulfonation reduces the degree of crystallinity, and hence, melting heat of fusion for corresponding endotherm peak area compared to neat LLDPE fibers.
Figure 4A:
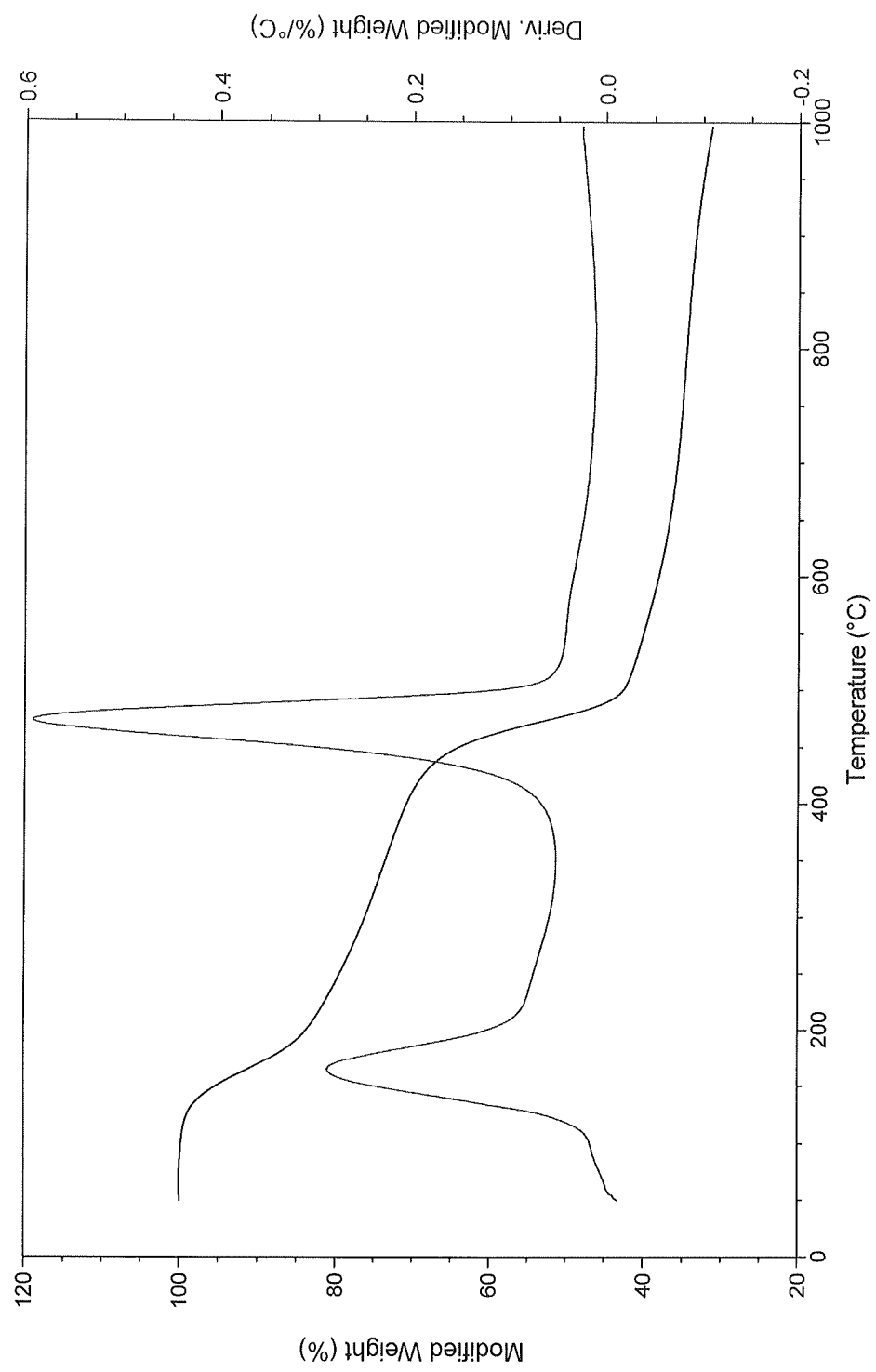
FIGS. 4A-4B. Thermogravimetric analysis (TGA) curve of partially sulfonated LLDPE fiber (FIG. 4A) and TGA curve of highly (almost fully) sulfonated LLDPE fiber (FIG. 4B).
Figure 4B:
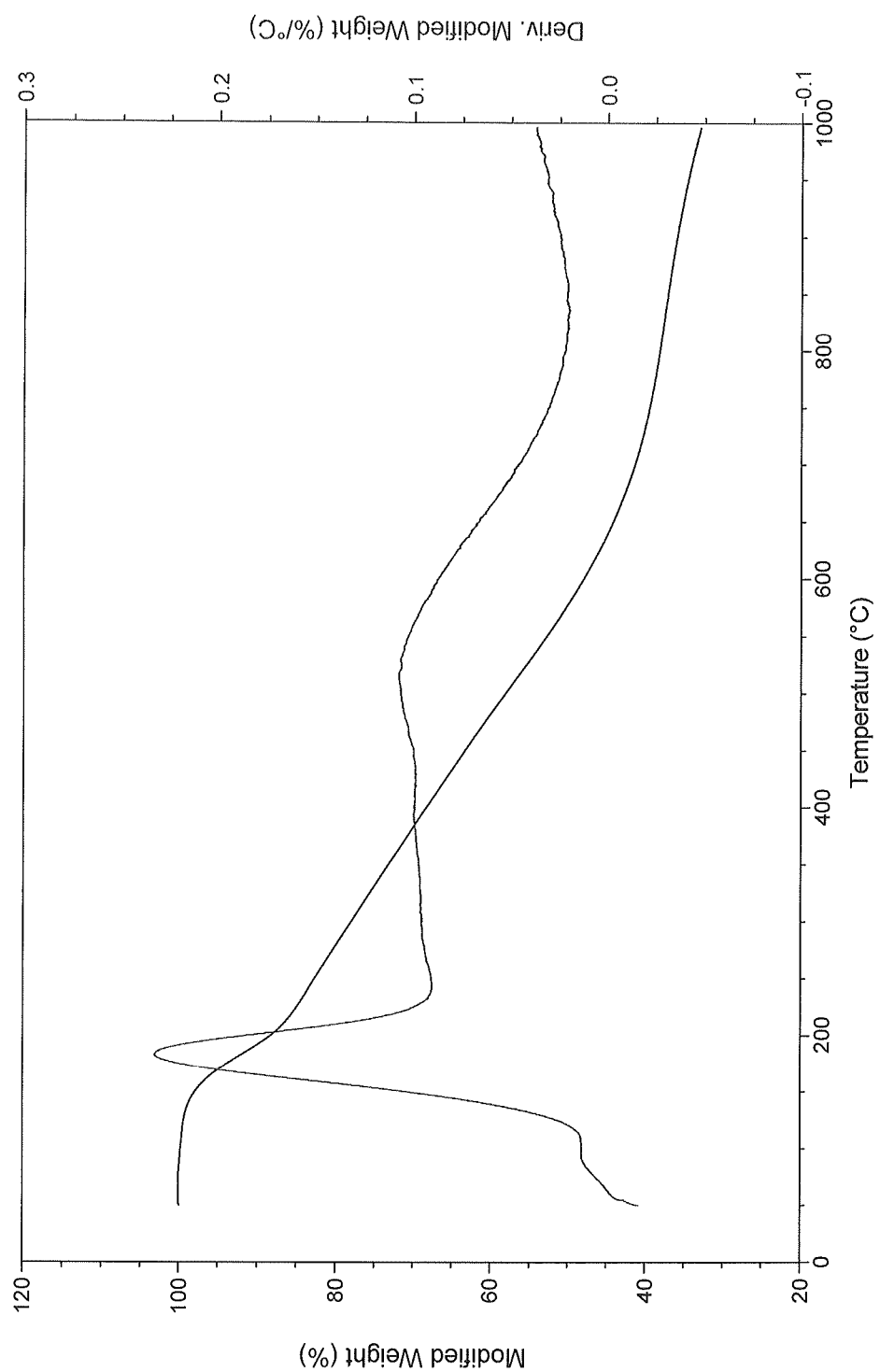

Fuming sulfuric acid containing 18-24% sulfur trioxide (oleum) was purchased and used without further purification for sulfonation. Spools of LLDPE fiber, prepared as above, were passed through a glass container filled with oleum at 70° C. from a creel of LLDPE fiber spool under constant tension, the fiber tow being pulled by a winder. The degree of sulfonation was controlled by varying the winder speed. The winder speed was adjusted to provide a residence time of about 2-90 minutes. The degree of sulfonation (DS) of the sulfonated LLDPE fibers was determined using thermogravimetric analysis (TGA) at a heating rate of 10° C./min to 1000° C. All samples were pre-dried at 100° C. for 1 hour in situ before starting the TGA scan. The DS was calculated as a molar ratio of sulfonic acid to polyethylene using the weight loss up to 400° C. from TGA as a weight fraction of the sulfonic acid, where all the functional groups on LLDPE were assumed to be sulfonic acid in the calculation. A variation in the degree of sulfonation was achieved by altering sulfonation time and temperature. With increase in degree of sulfonation, the crystallinity or the heat of fusion in filaments decreased. Heat of fusion was estimated from the melting endotherm observed in a differential scanning calorimetry scan (FIG. 3). Degree of sulfonation was confirmed by thermogravimetric data (FIGS. 4A-4B). As shown in FIG. 4A, the TGA of partially sulfonated LLDPE fiber exhibits a prominent peak corresponding to the decomposition of neat residual polyethylene around 450° C. As shown in FIG. 4B, the TGA of fully sulfonated LLDPE exhibits a near absence of a peak corresponding to the decomposition of neat residual polyethylene in the sulfonated fiber.

Non-Woven Mat Fabrication

Sulfonated polyethylene microfibers, as prepared above, were cut into staple form (cut fiber length was 1 centimeter) and converted to mat form by forming a slurry of the chopped fibers in water (1 g sulfonated fiber in 50 mL water). The fibers were suspended in water and stirred occasionally without any addition of a suspension stabilizer (i.e., no suspension stabilizer, such as polyvinyl alcohol, was included). The slurry was then filtered off to collect the layer of randomly oriented chopped filaments. The aqueous slurry of chopped sulfonated microfibers at room temperature formed a stable and rugged non-woven mat of chopped fiber strands when the dispersion was filtered in a Buchner funnel. Presumably due to extensive hydrogen bonding at the filament surface, interfilament bonding was found to be strong even in the wet form of the mat. Therefore, no polymeric binder was found necessary to bond the filaments. The mat was dried at 100° C. The dried mat contained interconnected filaments and exhibited very good integrity. The mat was then thermally treated under carbonization conditions at 1000° C. Thermal diffusion at the contact point of the filaments caused bonding in the carbonized filaments. Although not necessary, a brief wash of the mat with dilute sulfuric acid prior to drying was found to significantly encourage interfilament bonding.

Figure 5A:
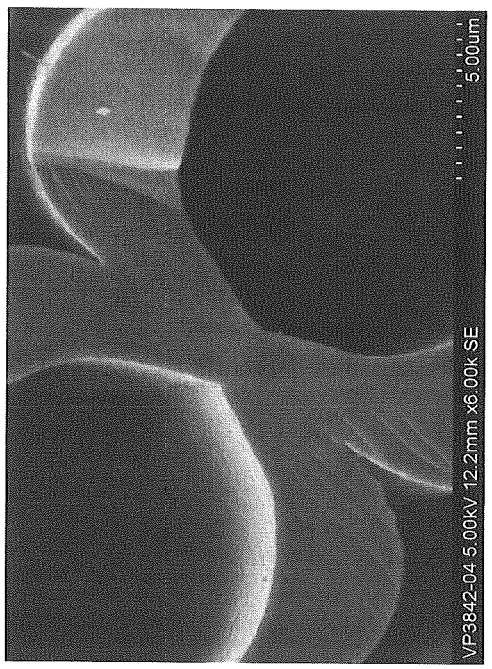
FIGS. 5A-5C. Scanning electron microscope (SEM) images of fused carbon fiber bundle of hollow trilobal precursor of 20 μm thickness showing interfilament bonding (FIG. 5A), non-woven carbon fiber mat made from 20 μm diameter fiber precursor (FIG. 5B) and 1 μm diameter microfiber precursor (FIG. 5C).
Figure 5B:
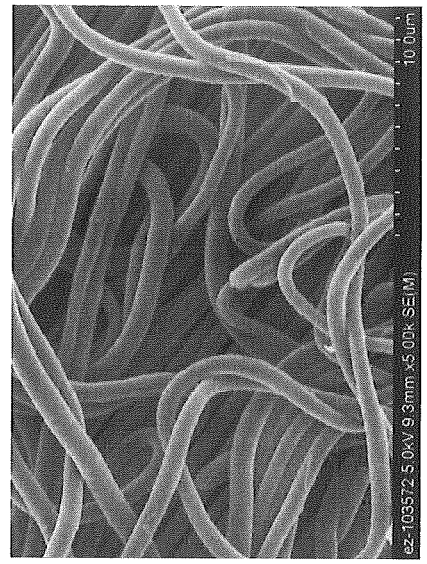
Figure 5C:
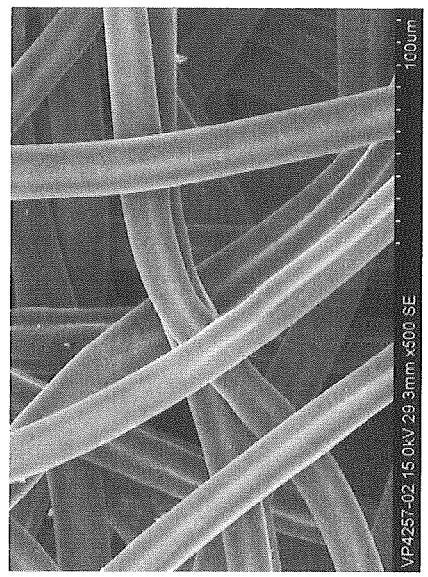

Thus, the foregoing example has demonstrated the facile production of non-woven mats made of carbon microfilaments. The method permits efficient and large-scale production of such mats from continuous fibers. Depending on the diameter of the filaments, the process described above for production of carbon fiber mat and paper formation may be assimilated in some respects to processes used in pulp and paper manufacturing, i.e., by use of a slurry molding process (for large diameters) or mesh screening and continuous processing through rollers to form thin non-woven fabric. FIG. 5A shows the interfilament bonding created in carbonized filaments derived from a sulfonated unwashed hollow bundle of trilobal filaments. FIGS. 5B-5C show scanning electron microscope (SEM) images of the resulting non-woven carbon fiber mat made from 20 μm diameter fiber precursor (FIG. 5B) and 1 μm diameter fiber precursor (FIG. 5C).

EXAMPLE 2

Figure 6A:
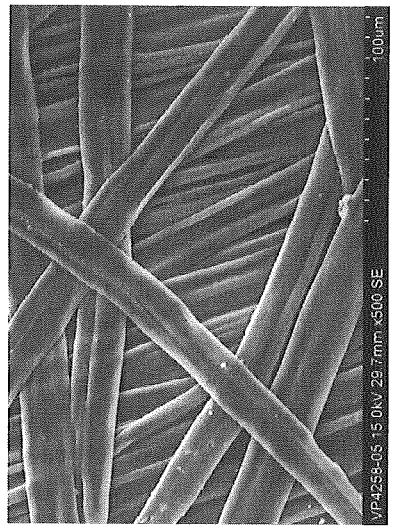
FIGS. 6A-6B. Scanning electron microscope (SEM) images of non-woven carbon fiber mat made from stamped non-woven mat precursor containing 20 μm diameter PE fiber.
Figure 6B:
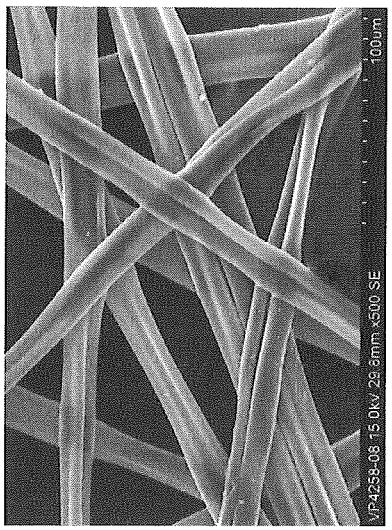

Production of a Non-Woven Mat Made of Carbon Fibers from Polyethylene (PE) Fiber Precursor by Mechanical Bonding of PE Fibers Followed by Sulfonation Polyethylene filaments of 20 μm diameter and 1 inch length were mixed randomly and pressed or stamped at 130° C. using a compression mold. For example, localized stamping on a mat by passing the thick filament layers through a grooved hot roller was simulated in the lab. In this way, a non-woven bonded precursor mat was produced. Sulfonation of the PE precursor mat was conducted at 70° C. using oleum. The sulfonated mat was washed and dried at 100° C., and then carbonized at 1000° C. Scanning electron microscope (SEM) images of the resulting carbonized mats processed under identical conditions are displayed in FIGS. 6A-6B. FIG. 6A shows bonded filaments in a very thin mat, whereas FIG. 6B shows bonded carbon mat containing a high density of filaments. The density of filaments can be measured as bulk density or as mass per unit volume.

Significantly, sulfonation of a polyolefin fiber preform, as described above, may be incomplete at the bonded regions of the web due to diffusion problems. If the sulfonation is not complete at the bonded regions, the bonded regions will volatilize and be converted to pores during the carbonization process. For some applications, such pore formation is preferably avoided. When such pore formation is to be avoided, the methodology described in Example 1 (i.e., based on physical interaction (hydrogen bonding) of presulfonated filaments) may be preferred. However, there are applications for which such pore formation is desired, such as when the carbon non-woven mat is to be used in filtration, gas adsorption, or charge storage.

EXAMPLE 3

Figure 7:
FIG. 7. Scanning electron microscope (SEM) image of scissor-cut smeared surface of a plasticized sulfonated polyethylene fiber bundle.

Production of a Non-Woven Mat Made of Carbon Fibers by Use of a Plasticizer and Hot Stamping A sulfonated tow of LLDPE fibers that was sulfonated at 97° C. for 10 hours appeared to be in plasticized form (plasticized with conc. sulfuric acid). The fibers exhibited 20% or more ultimate elongation, i.e., significant stretchability. The sulfonated tow was also plasticized with vegetable oil-based spin finish, water, or glycerol solution prior to carbonization. A SEM image of a fully sulfonated plasticized tow is shown in FIG. 7. As shown by the SEM image, the surfaces of the fibers are deformed by virtue of the substantial ductility of the plasticized fibers. The tow was hot pressed at 100° C. to make a hot pressed mat of randomly oriented filaments. The mat was subsequently carbonized at 1000° C.

Figure 8:
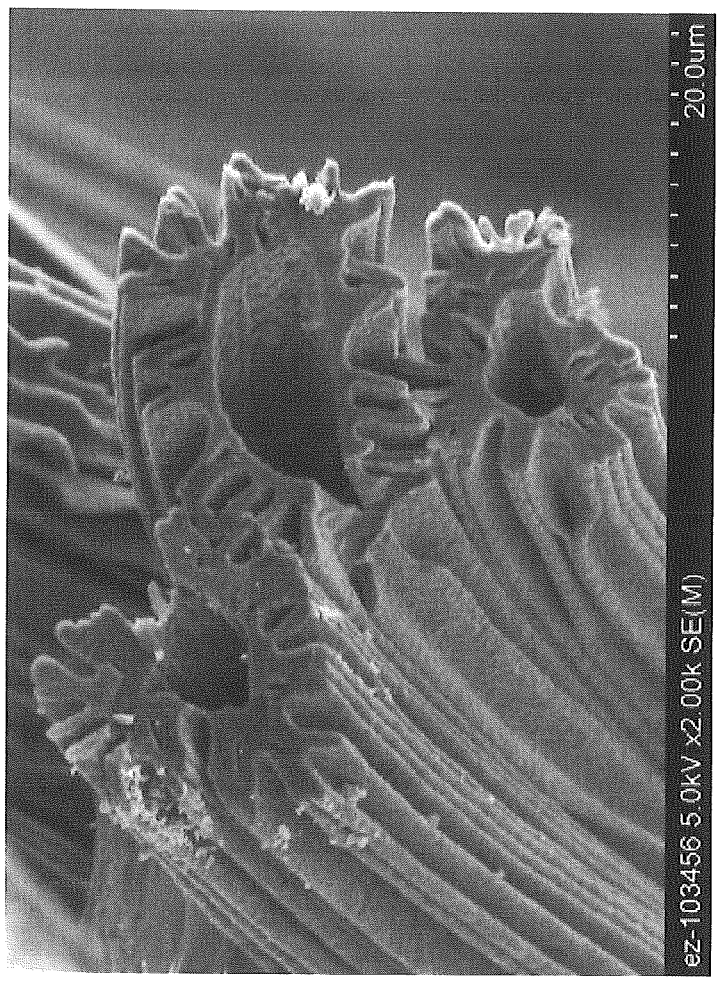
FIG. 8. Scanning electron microscope (SEM) images of fractured surface of an interlocked gear-shaped carbon fiber mat with multiple microchannels, which makes it particularly suitable for adsorption and water purification applications.

A carbon fiber mat was also produced from an oleum-treated intermingled bundle of 20-micron diameter gear-shaped LLDPE precursor. The tow was sulfonated at 80° C. for 1 hour. The dried fibers were carbonized at 1200° C. The SEM image of the carbonized form of the oleum-treated bundle is shown in FIG. 8. As shown in FIG. 8, the bundle includes micron scale channels (parallel to the fiber axis) formed by mechanical interlocking of the gear teeth on the fiber surface.

CONCLUSIONS

Sulfonated polyolefin fibers are flexible and can be easily converted to bonded non-woven mats by (A) thermal desulfonation and diffusion at the filament contact points by a subsequent hot stamping process to produce a thermally bonded non-woven, or (B) plasticization of the sulfonated staple fibers using solvents (e.g., DMSO, DMF, DMAc, glycerol, or water) followed by mechanical pinning for bonding of the filaments at low temperature, or (C) by simple physical contact of the staple filament web to a moist environment, which initiates strong hydrogen bonding interactions. The resulting mat or paper preform is conveniently carbonized to provide a mat or paper made of strongly bonded carbon fibers.

These examples offer a facile and straight-forward methodology for fabricating carbon non-woven mats from a variety of polyolefin fiber types. Significantly, the methods described herein can provide a substantial benefit to the environment for at least the reason that they can produce carbon non-woven mats, carbon papers, or felts from recycled polyolefin non-wovens, such as carpet, geotextile, non-woven hygiene products (e.g., diapers) and other reclaimed personal care products made of polyolefins.

While there have been shown and described what are at present considered the preferred embodiments of the invention, those skilled in the art may make various changes and modifications which remain within the scope of the invention defined by the appended claims.

What is claimed is:

1. A method for the preparation of a non-woven mat or paper made of carbon fibers, the method comprising:
   (i) contacting a plurality of sulfonated polyolefin fibers with water to bond said plurality of sulfonated polyolefin fibers to form a precursor of a non-woven mat or paper of carbon fiber in which said plurality of sulfonated polyolefin fibers are bonded by hydrogen or ionic bonding interactions; and (ii) carbonizing said precursor of a non-woven mat or paper to produce said non-woven mat or paper comprised of carbon fibers.

2. The method of claim 1, wherein said sulfonated polyolefin fibers are completely sulfonated.

3. The method of claim 1, wherein said sulfonated polyolefin fibers are partially sulfonated.

4. The method of claim 1, wherein said polyolefin is a thermoplastic elastomeric polyolefin.

5. The method of claim 1, wherein said polyolefin is selected from polyethylene, polypropylene, and combinations thereof.

6. The method of claim 1, wherein said method further comprises producing said sulfonated polyolefin fibers by sulfonation of polyolefin fibers.

7. The method of claim 6, wherein said sulfonation of polyolefin fiber comprises contacting said polyolefin fiber with sulfur trioxide, sulfur dioxide, or a mixture thereof.

8. The method of claim 7, wherein said sulfonation of polyolefin fiber comprises submerging said polyolefin fiber in gaseous sulfur trioxide-containing sulfuric acid.

9. The method of claim 7, wherein said sulfur trioxide, sulfur dioxide, or mixture thereof is in admixture with one or more oxidants.

10. The method of claim 6, wherein said sulfonation of said polyolefin fiber comprises melt mixing a precursor resin of said polyolefin fiber with a sulfonated material to produce a melt-mixed composite, and spinning the melt-mixed composite to produce a melt-mixed composite fiber.

11. The method of claim 10, wherein said sulfonated material is an organic sulfonated compound or material.

12. The method of claim 11, wherein said organic sulfonated compound or material is selected from sulfonated graphene, sulfonated diene rubber, sulfonated polyolefin, sulfonated polystyrene, polyvinyl sulfate, and sulfonated lignin.

13. The method of claim 10, wherein said sulfonated material is a non-metallic inorganic sulfate.

14. The method of claim 13, wherein said non-metallic inorganic sulfate is selected from ammonium sulfate or ammonium bisulfate.

15. The method of claim 6, wherein said method further comprises producing said polyolefin fibers before sulfonation of said polyolefin fibers.

16. The method of claim 15, wherein said polyolefin fibers are produced by a multicomponent spinning technique.

17. The method of claim 15, wherein said polyolefin fibers are produced by a melt-processing technique.

18. The method of claim 17, wherein said melt-processing technique is a melt-spinning or melt-blowing technique.

19. The method of claim 15, wherein said polyolefin fibers are produced by a solution-spinning technique.

20. The method of claim 1, wherein said method further comprises producing said sulfonated polyolefin fibers by producing fibers from a sulfonated polyolefin resin.

21. The method of claim 20, wherein said sulfonated polyolefin fibers are produced by a solution-spinning technique.

22. The method of claim 1, wherein contacting said plurality of sulfonated polyolefin fibers with water comprises immersing said plurality of sulfonated polyolefin fibers in water or an aqueous solution.

23. The method of claim 22, wherein said plurality of sulfonated polyolefin fibers that have been immersed in water or aqueous solution are filtered to form a self-assembled precursor of a non-woven mat or paper of carbon fiber.

24. The method in claim 22, wherein said plurality of sulfonated polyolefin fibers are processed to form a mat structure by being passed through a slit die.

25. The method of claim 1, wherein contacting said plurality of sulfonated polyolefin fibers with water comprises exposing said plurality of sulfonated polyolefin fibers to water vapor.

26. The method of claim 1, wherein said sulfonated polyolefin fibers have a multi-component polymer fiber composite structure.

27. The method of claim 26, wherein said sulfonated polyolefin fibers have a sulfonated outer layer and an unsulfonated core, wherein said unsulfonated core is volatilized during carbonization to form a hollow core or removed by solvent dissolution before carbonization, and said sulfonated outer layer is carbonized during carbonization to form a carbon outer layer, wherein at least the sulfonated outer layer is comprised of a polyolefin.

28. The method of claim 27, wherein said unsulfonated core has a complex shape, wherein a carbon fiber having a complex-shaped hollow core is produced during carbonization.

29. The method of claim 1, wherein said sulfonated polyolefin fibers are hollow sulfonated polyolefin fibers.

30. The method of claim 29, wherein said hollow sulfonated polyolefin fibers are produced in a process comprising sulfonating hollow polyolefin fiber.

31. The method of claim 26, wherein said sulfonated polyolefin fibers have a sulfonated polymer core having a circular or complex shape and an unsulfonated outer layer, wherein said unsulfonated outer layer is volatilized during carbonization or removed by solvent dissolution before carbonization, and said sulfonated polymer core is carbonized during carbonization to produce a polymer fiber having a circular- or complex-shaped outer surface, wherein at least the sulfonated polymer core is comprised of a polyolefin.

32. The method of claim 1, wherein said plurality of sulfonated polyolefin fibers are continuous.

33. The method of claim 1, wherein said plurality of sulfonated polyolefin fibers are discontinuous.

34. The method of claim 1, wherein the carbon fibers have a diameter of less than 50 microns.

35. The method of claim 1, wherein the carbon fibers have a diameter of less than 20 microns.

36. The method of claim 1, wherein the carbon fibers have a diameter of up to 1 micron.

37. The method of claim 1, wherein the carbon fibers have a diameter of up to 200 nm.

38. The method of claim 1, wherein the carbon fibers have a diameter of up to 50 nm.

* * * * *